United States Patent
Fukushima et al.

(10) Patent No.: US 6,253,023 B1
(45) Date of Patent: *Jun. 26, 2001

(54) IMAGE PICKUP DEVICE

(75) Inventors: Nobuo Fukushima, Kanagawa-ken; Yoichi Yamagishi, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,805

(22) Filed: Mar. 24, 1997

Related U.S. Application Data

(63) Continuation of application No. 08/272,993, filed on Jul. 13, 1994, now Pat. No. 5,642,458, which is a continuation of application No. 07/978,410, filed on Nov. 18, 1992, now abandoned.

(30) Foreign Application Priority Data

| Nov. 21, 1991 | (JP) | ................................................ 3-306242 |
| Apr. 13, 1992 | (JP) | ................................................ 4-092888 |
| Apr. 17, 1992 | (JP) | ................................................ 4-098059 |

(51) Int. Cl.[7] .............................................. H04N 5/225
(52) U.S. Cl. ........................................... 386/117; 348/372
(58) Field of Search .................................. 348/372, 207; 386/1, 46, 45, 125–126, 120; 369/116; 358/906, 909.1; H04N 5/76, 5/781, 5/225

(56) References Cited

U.S. PATENT DOCUMENTS

| 4,814,876 | | 3/1989 | Horio et al. ........................ 358/160 |
| 4,945,424 | * | 7/1990 | Hiroki et al. ...................... 358/906 |
| 5,070,406 | * | 12/1991 | Kinoshita .......................... 348/372 |
| 5,099,262 | * | 3/1992 | Tanaka et al. ..................... 348/372 |
| 5,111,299 | * | 5/1992 | Aoki et al. ........................ 348/372 |
| 5,289,451 | * | 2/1994 | Ashinuma et al. ................. 369/116 |
| 5,418,926 | * | 5/1995 | Horii et al. ..................... 358/909.1 |
| 5,561,462 | * | 10/1996 | Nagano ............................ 348/372 |
| 5,642,458 | * | 6/1997 | Fukushima et al. ................. 386/46 |
| 5,696,555 | * | 12/1997 | Kashimura ........................ 348/372 |

FOREIGN PATENT DOCUMENTS

| 0336317 | 10/1989 | (EP) . |
| 0412461 | 2/1991 | (EP) . |

* cited by examiner

*Primary Examiner*—Thai Tran
(74) *Attorney, Agent, or Firm*—Robin Blecker & Daley

(57) ABSTRACT

An information signal processing apparatus according to the present invention is an apparatus for processing an information signal. The apparatus is arranged to temporarily store information data inputted thereinto and move, after a predetermined amount of information data is stored, a moving element of a recording medium into which the information data is to be recorded, so that it is possible to stably execute continuous recording of the information signal by means of a simple arrangement with a small power consumption.

9 Claims, 19 Drawing Sheets

IMAGE PICKUP DEVICE

This application is a continuation, of application Ser. No. 08/272,993, filed Jul. 13, 1994, now U.S. Pat. No. 5,642,458, which is a continuation of Ser. No. 07/978,410, filed Nov. 18, 1992.

BACKGROUND OF THE INVENTION

1. Field of the Invention

The present invention relates to an information signal processing apparatus for processing an information signal.

2. Description of the Related Art

An electronic still video system has heretofore been known as one example of an information signal processing apparatus for processing an information signal. The electronic still video system is arranged to record image signals on a plurality of recording tracks which are concentrically formed on a magnetic disk, and to select an arbitrary recording track from among the recording tracks formed on the magnetic disk and reproduce the image signal recorded on the selected recording track.

Such an electronic still video system is arranged to record the image signals on the recording tracks formed on the magnetic disk, in the state of analog signals. However, a new system has recently been proposed which is arranged to digitize an image signal obtained by photographing a subject by using a video camera or the like and store the digitized image signal in a memory card including a plurality of RAMs (random access memories).

To digitize the image signal and store the digitized image signal in the memory card, a memory card having a large storage capacity is needed since the digitized image signal has an enormous amount of information. However, since the memory card having the large storage capacity is costly, the above-described system is extremely expensive.

To cope with this problem, a system has recently been considered which is capable of storing a digitized image signal by using a hard disk unit which is lower in cost and larger in storage capacity than the aforesaid memory card.

In the system using such a hard disk unit, during the process of digitizing an image signal obtained by photographing a subject by means of a video camera or the like and recording the digitized image signal on a hard disk of the hard disk unit, it takes a predetermined time for the hard disk to reach its stable rotational speed which permits the hard disk unit to execute a storing operation. For this reason, some type of system adopts an arrangement which causes the hard disk to start its rotation before a start of a photographing-and-recording operation and, after the rotation has settled, holds the hard disk in a continuous rotating state during a wait for the start of the photographing-and-recording operation. Another type of system is provided with a buffer memory for temporarily storing a digitized image signal. In this type of system, image data corresponding to a photographed image is stored in the buffer memory, and after the rotation of the hard disk has settled, the image data stored in the buffer memory is read out and transmitted to the hard disk for storing purpose.

However, if the hard disk is held in the continuous rotating state during the wait for the start of the photographing-and-recording operation, power consumption will increase. As a result, if a portable, electric power source, such as a battery, is used to supply electricity to the electronic still video system, it will be necessary to frequently perform battery replacement. In the case of the buffer memory, during the continuous-shooting recording operation of continuously storing, on a hard disk, image signals continuously supplied from a video camera or the like, the buffer memory for temporarily storing image data may overflow, thereby interrupting the continuous-shooting recording operation at an intermediate time.

Still another type of system has recently been proposed in which a memory card provided with a memory device, such as a DRAM, an SRAM or an EEPRM, is used as a recording medium so that digitized still image and audio signals are recorded into the memory card.

However, the storage capacity of the memory card is limited because of the limited storage capacity per chip of the memory device or limits of the number of chips which can be mounted on a single memory card. In addition, since the memory device is more expensive than other recording media, it is economically difficult to utilize the memory card as a recording medium of large storage capacity.

In contrast, the aforementioned hard disk unit is known as a recording medium having a larger storage capacity than the memory card, and there has recently been provided a hard disk unit which is removably attachable to a main apparatus similarly to the memory card. If such a removable hard disk unit is used with an electronic still video camera as a recording medium, it is possible to construct comparatively inexpensively a system having a large storage capacity.

Various kinds of hard disk units are provided in accordance with various specifications such as recording capacity, weight, power consumption and recording speed. If the system is constructed so that plural kinds of hard disk units can be attached, it is possible to meet a variety of demands of users.

However, unlike the memory card having no mechanically moving part, the hard disk unit has the disadvantages that it is necessary to rotate a hard disk inside thereof during recording of an information signal and that a comparatively long time and electric power, which is larger than that during a normal rotating operation, are required during the start of rotation of the hard disk. For these reasons, a general arrangement is as follows: After the hard disk has been started up, it is held in a continuous rotating state for some time, and if a predetermined time elapses or the recording of the information signal is completed, the rotation of the hard disk is stopped.

However, if an electronic still video camera is constructed so that plural kinds of hard disk units can be attached as described above, since each kind of hard disk unit takes a different time to start up its hard disk, it is necessary to set the time interval during which the hard disk is held in a continuous rotating state after being started up, according to a particular hard disk unit from among the hard disk units attachable to the camera body of the electronic still video camera, that is, a hard disk unit which includes a hard disk having the longest start-up time and which consumes the largest amount of electric power during the start-up time of the hard disk.

For these reasons, the conventional system has the following problems. Even if a hard disk unit, which includes a hard disk having a short start-up time and which does not consume a large amount of electric power during the start-up time of the hard disk, is attached to the camera body, the hard disk is held in a continuous rotating state over a time interval longer than required with the result that a wasteful electric power is consumed. Since the aforesaid electronic still video camera is typically a portable apparatus which relies on a battery for its power supply, the wasteful power consumption remarkably decreases the time per battery during which the system can be operated to record information signals. As a result, if such an electronic still video camera is used to record still-image signals, the number of still-image pictures recordable per battery will be decreased.

Since the above-described electronic still video camera (electronic still camera) is arranged to perform digital recording, it is common practice to use a digital interface (I/F) as a transmission unit for transmitting data from the electronic still camera to external equipment.

Various types of digital I/Fs are available. However, since cameras are limited in body size, it is in many cases impossible to attach digital I/Fs of the type generally used with personal computers or the like to the cameras. For this reason, small digital I/Fs are generally used as transmission units dedicated to the cameras.

Alternatively, a method is proposed which utilizes a connector for a memory card as a digital I/F for transmission purpose.

Since electronic still cameras of the type using memory cards are provided with connectors for the memory cards, it is also possible to transmit data from such an electronic still camera to external equipment by using this general-purpose type of digital I/F.

However, in the case of an electronic still camera provided with both a transmission unit which is a digital I/F dedicated to the camera and a transmission unit which is a general-purpose digital I/F using a connector for a memory card, there is the problem that if both of the transmission units are connected to external equipment, it is impossible to determine which of the transmission units can be used to achieve optimum transmission.

SUMMARY OF THE INVENTION

It is, therefore, an object of the present invention to provide an information signal recording apparatus capable of solving the above-described problems.

Another object of the present invention is to provide an image signal processing apparatus capable of stably executing continuous recording of an image signal by means of a simple arrangement with a small power consumption.

To achieve the above-described objects, according to one aspect of the present invention, there is provided an image signal processing apparatus for processing an image signal, which comprises first storage means for temporarily storing image data inputted thereinto and outputting the image data, second storage means having a moving element for storing in a recording medium the image data outputted from the first storage means, and operation controlling means for moving the moving element of the second storage means after a predetermined amount of image data is stored in the first storage means.

Another object of the present invention is to provide an image signal processing apparatus capable of stably executing continuous recording of an image signal by means of a simple arrangement in accordance with the kind of each recording medium.

To achieve the above-described object, according to another aspect of the present invention, there is provided an information signal recording apparatus for recording an information signal by using a recording medium, which comprises connection means capable of being connected to plural kinds of recording media, and controlling means for controlling, according to the kind of a recording medium connected to the connection means, a starting time of a recording operation for recording an information signal by using the recording medium and a starting time of a supplying operation for supplying electric power required for the recording operation.

Another object of the present invention is to provide an information signal recording apparatus capable of recording an information signal in an optimum state while reducing an excess power consumption by optimumly controlling the start-up time of a recording medium which is selected from among plural kinds of recording media for the purpose of recording an information signal, which start-up time is needed to initiate a recording operation for recording the information signal by using the selected recording medium, and the supply of the electric power required for the recording operation, in accordance with the kind of the selected recording medium.

To achieve the above-described object, according to another aspect of the present invention, there is provided an information signal recording apparatus for recording an information signal by using a recording medium, which comprises a plurality of connection means capable of being respectively connected to plural kinds of recording media, selecting means for selecting a recording medium from among recording media respectively connected to the plurality of connection means, and controlling means for controlling, according to the kind of the recording medium selected by the selecting means, a starting time of a recording operation for recording an information signal by using the recording medium and a starting time of a supplying operation for supplying electric power required for the recording operation.

Another object of the present invention is to provide an information signal transmitting apparatus capable of reliably transmitting an information signal.

To achieve the above-described object, according to another aspect of the present invention, there is provided an information signal transmitting apparatus for transmitting an information signal, which comprises plural kinds of reception means for receiving an information signal, connection means capable of being connected to any one reception means from among the plural kinds of reception means, plural kinds of transmission means for transmitting the information signal to the reception means connected to the connection means, and controlling means for providing control to select any one transmission means from among the plural kinds of transmission means, according to the kind of the reception means connected to the connection means, and execute transmission of the information signal.

Another object of the present invention is to provide an information signal transmitting apparatus having an improved operability.

To achieve the above-described object, according to another aspect of the present invention, there is provided an information signal transmitting apparatus for transmitting an information signal, which comprises plural kinds of transmission means for transmitting an information signal, connection means to which the plural kinds of transmission means can be connected, detection means for detecting transmission capabilities of the plural kinds of transmission means connected to the connection means, and controlling means for providing control to select any one transmission means from among the plural kinds of transmission means connected to the connection means, according to a detection result provided by the detection means, and execute transmission of the information signal.

The above and other objects, features and advantages of the present invention will become apparent from the fol-

DETAILED DESCRIPTION OF THE PREFERRED EMBODIMENTS

Embodiments of the present invention will be described below with reference to the accompanying drawings.

Figure 1:
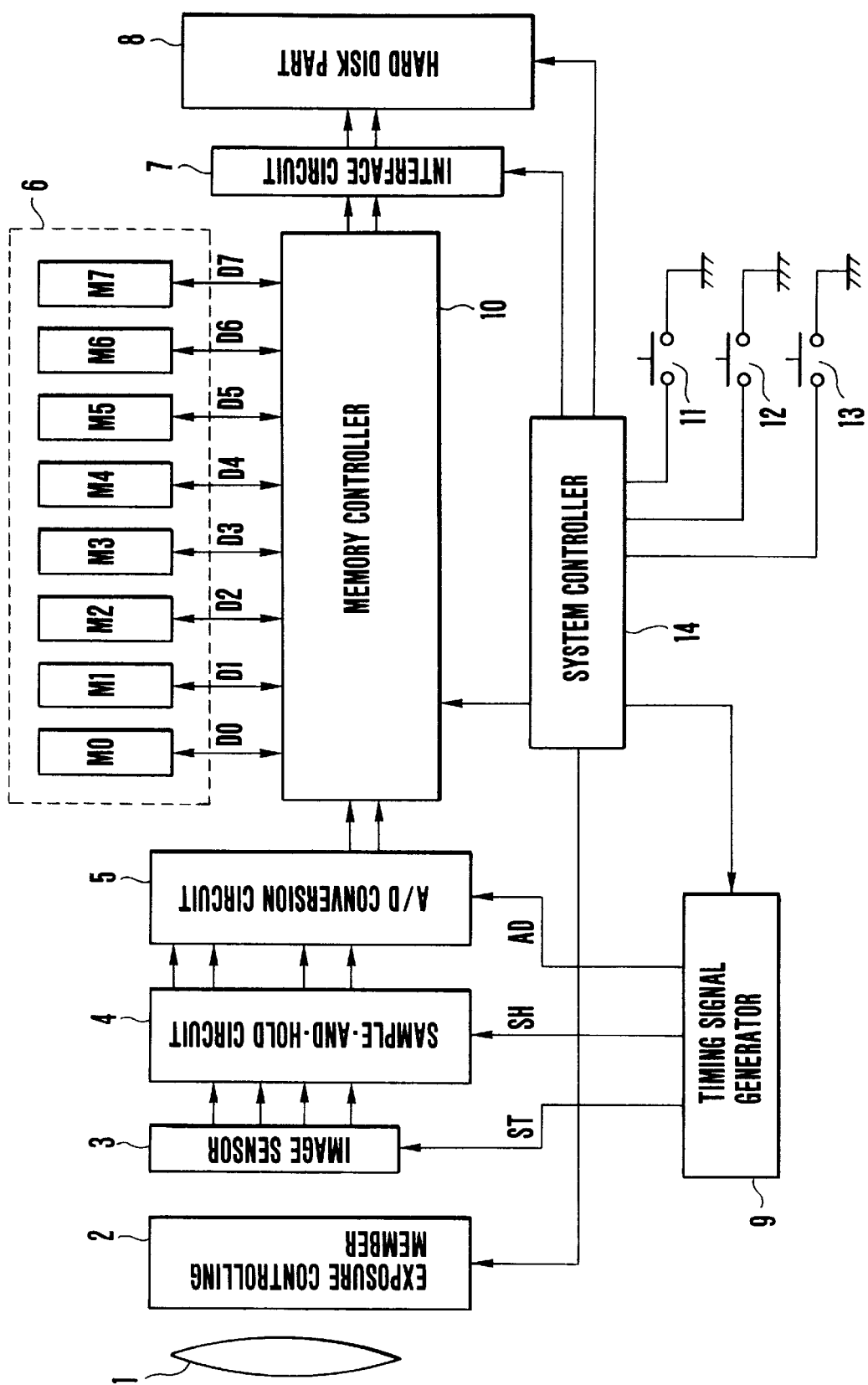
FIG. 1 is a block diagram schematically showing the arrangement of an electronic still video system to which the present invention is applied as a first embodiment thereof.

FIG. 1 is a block diagram schematically showing the arrangement of an electronic still video system to which the present invention is applied as a first embodiment thereof.

The electronic still video system shown in FIG. 1 includes an optical system 1 composed of a photographic lens, an exposure controlling member 2 made up of a diaphragm mechanism, a shutter mechanism and associated elements, an image sensor 3, a sample-and-hold circuit 4 for sampling and holding an analog image signal generated from the image sensor 3, an analog/digital (A/D) conversion circuit 5 for converting an analog image signal outputted from the sample-and-hold circuit 4 into digital image data, a memory part 6 made up of a plurality of buffer memories (M0 to M7 in FIG. 1) each consisting of a D-RAM (Dynamic Random Access Memory), a digital interface circuit 7 for supplying image data outputted from the memory part 6 to a hard disk part 8 which will be described later, the hart disk part 8 for receiving image data outputted from the memory part 6 and supplied through the digital interface circuit 7 and storing the received image data on its hard disk, a timing signal generator 9 for generating various kinds of timing signals such as a drive pulse (ST in FIG. 1) for driving the image sensor 3, a sample-and-hold pulse (SH in FIG. 1) for controlling a sample-and-hold operation executed by the sample-and-hold circuit 4, and a clock pulse (AD in FIG. 1) for controlling a conversion operation executed by the A/D conversion circuit 5, a memory controller 10 for controlling the image-data storing and reading operations of the memory part 6 as well as the D-RAM refreshing operation of the same, a first release switch SW1 11, a second release switch SW2 12, a lock switch 13 for inhibiting acceptance of instructions from each of the first and second release switches SW1 and SW2, and a system controller 14 for controlling the operation of the entire system.

The specifications of the hard disk part 8 used in the first embodiment will be described below.

The hard disk part 8 in the first embodiment is provided with a general-purpose hard disk unit manufactured by a hard-disk maker such as CONNER, PRAIRIE-TEK or AREAL.

The hard disk unit has the following three modes: an active mode, a power save mode and a standby mode.

The active mode is a mode for indicating that the hard disk unit is executing a data reading operation, a data writing operation or a sector seeking operation or the hard disk unit is placed in an idle state where the hard disk is rotating while waiting for the next command.

The power save mode is a mode for indicating that the hard disk is rotating with a head being retracted from the hard disk. Mode switching from the power save mode to the aforesaid active mode takes approximately several hundred milliseconds.

The standby mode is a mode for indicating that the rotation of the hard disk is stopped. Mode switching from the standby mode to the active mode takes a longer time than the mode switching from the power save mode to the active. mode.

The hard disk unit has, in its normal form, the function of automatically switching from the active mode to the power save mode or the standby mode if the state of executing none of the data writing operation, the data reading operation and the sector seeking operation continues during a predetermined time when the active mode is selected. In the first embodiment, however, it is assumed that such function is not employed and that after the hard disk unit has received a command, the hard disk unit immediately switches to a desired mode.

A photographing-and-recording operation executed by the electronic still video system shown in FIG. 1 will be described below with reference to the operational flowchart shown in FIG. 2.

Figure 2:
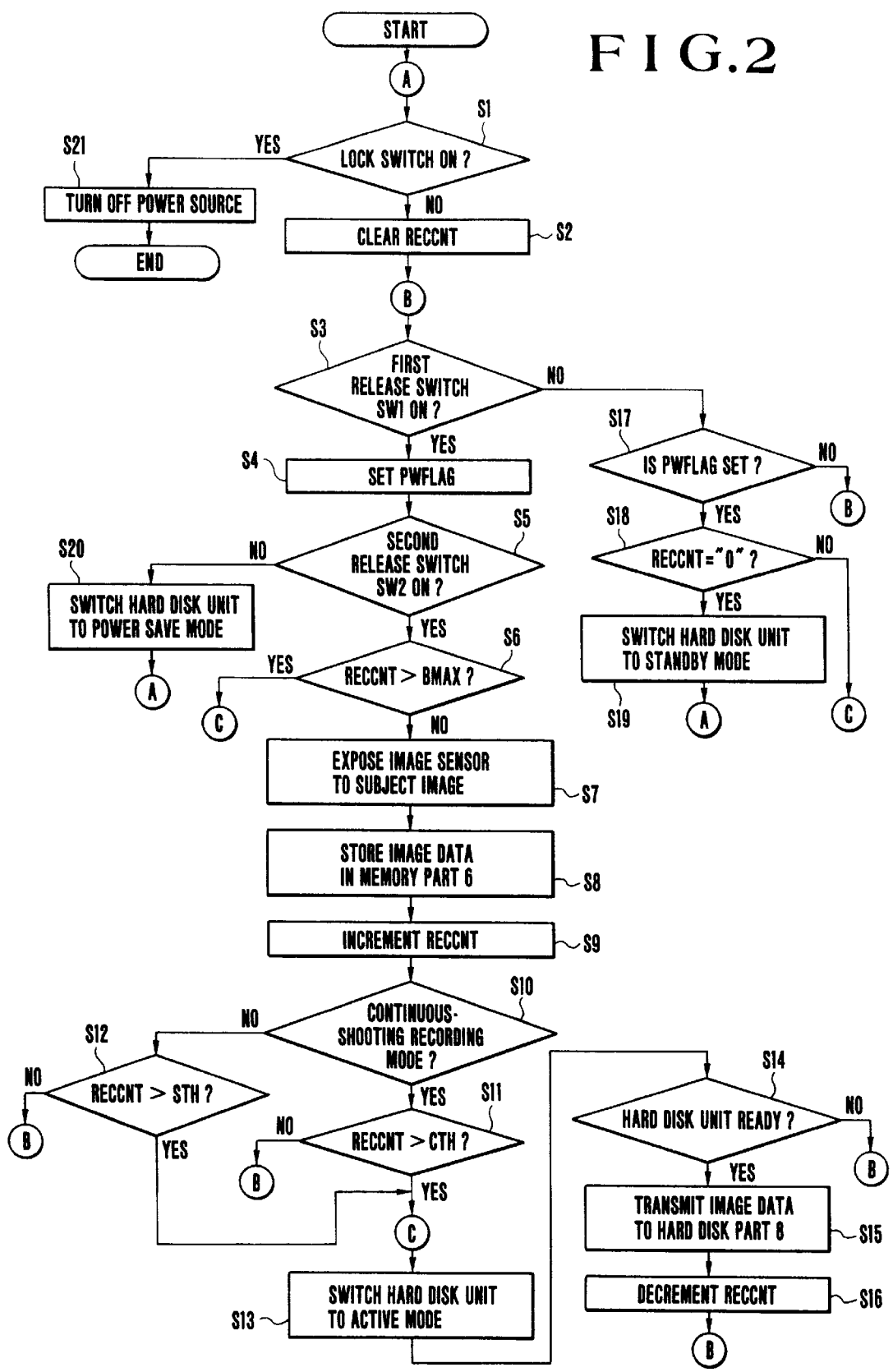
FIG. 2 is an operational flowchart aiding in explaining a photographing-and-recording operation executed by the electronic still video system shown in FIG. 1.

FIG. 2 is an operational flowchart aiding in explaining the photographing-and-recording operation executed by the electronic still video system shown in FIG. 1.

Referring to FIG. 2, a decision is initially made as to the state of the lock switch 13. If the lock switch 13 is turned off, the count value of a counter (hereinafter referred to as "the RECCNT") is cleared to "0" (Steps S1 and S2 in FIG. 2). The RECCNT is provided in the system controller 14 and serves to count the number of images corresponding to image data stored in the memory part 6.

If it is determined in Step S1 that the lock switch 13 remains on, the flow proceeds to Step S21, where the system controller 14 turns off an electric power source which is not shown.

Then, the system controller 14 examines the operational state of the first release switch SW1 11. If the first release switch SW1 11 is on, the system controller 14 causes the electric power source (not shown) to start supplying electricity to the hard disk part 8, and also sets a flag (hereinafter referred to as "the PWFLAG") indicative of the state where electricity is being supplied from the electric power source to the hard disk part 8 (Steps S3 and S4 in FIG. 2).

Then, the system controller 14 examines the operational state of the second release switch SW2 12. If the second release switch SW2 12 is off, the system controller 14 transmits a power save command to the hard disk unit provided in the hard disk part 8, and the hard disk unit which has received the power save command starts switching to the above-described power save mode (steps S5 and S20 in FIG. 2).

In Step S5 of FIG. 2, if it is determined that the second release switch SW2 12 is on, the system controller 14 examines whether the buffer memories M0 to M7 in the memory part 6 have overflown (Steps S5 and S6 in FIG. 2).

More specifically, in Step S6 of FIG. 2, it is determined whether the count value of the RECCNT exceeds a value BMAX indicative of the maximum storable number of images corresponding to image data stored in the memory part 6, thereby examining whether the buffer memories M0 to M7 in the memory part 6 have overflown.

If it is determined in Step S6 of FIG. 2 that the count value of the RECCNT does not exceed the value BMAX, the system controller 14 controls the shutter mechanism of the exposure controlling member 2 to expose the imaging surface of the image sensor 3 to a subject image. The image signal outputted from the image sensor 3 is sampled and held by the sample-and-hold circuit 4, and the analog output from the sample-and-hold circuit 4 is converted into digital image data by the A/D conversion circuit 5. The digital image data provided by the A/D conversion circuit 5 is supplied to the memory part 6, in which the supplied digital image data is stored in the buffer memories M0 to M7. Then, the count value of the RECCNT provided in the system controller 14 is incremented to store a count value indicative of the number of images corresponding to the image data stored in the buffer memories M0 to M7 of the memory part 6. (Refer to Steps S6 to S9 of FIG. 2.)

During the above-described operation, the image sensor 3, the sample-and-hold circuit 4 and the A/D conversion circuit 5 are respectively driven by pulses such as the drive pulse ST, the sample-and-hold pulse SH and the clock pulse AD outputted from the timing signal generator 9.

The system controller 14 determines whether a shooting recording mode which is set by operating an operating part (not shown) is a continuous-shooting recording mode or a single-shooting recording mode (Step S10 in FIG. 2). If the continuous-shooting recording mode is set, the flow proceeds to Step S11 of FIG. 2, where it is. determined whether the count value of the RECCNT exceeds a value CTH indicative of a predetermined storable number of exposures. If the single-shooting recording mode is set, the flow proceeds to Step S12 of FIG. 2, where it is determined whether the count value of the RECCNT exceeds a value STH indicative of a predetermined storable number of exposures.

The value CTH used during the continuous-shooting recording mode is selected to be greater than the value STH used during the single-shooting recording mode.

If the count value of the RECCNT exceeds the value CTH or STH in Step S11 or S12 of FIG. 2, the system controller 14 transmits an active command to the hard disk unit provided in the hard disk part 8, and the hard disk unit which has received the active command is switched to the above-described active mode, where the hard disk in the hard disk unit is made to start rotating (Step S13 in FIG. 2). If the count value of the RECCNT does not exceed the value CTH or STH, the system controller 14 returns the flow to the connection symbol B shown in FIG. 2 and waits for the next photographing-and-recording operation.

Then, the system controller 14 examines whether the rotation of the hard disk in the hard disk unit has settled to such an extent that image data is writable to the hard disk (hereinafter referred to as "the READY state"). If the READY state has not yet been reached, the flow returns to the connection symbol B of FIG. 2 (Step S14 in FIG. 2).

If it is determined in Step S14 of FIG. 2 that the READY state has been reached, the image data stored in the buffer memories M0 to M7 of the memory part 6 are transmitted to the hard disk part 8, and the count value of the RECCNT provided in the system controller 14 is decremented by the number of images corresponding to the image data transmitted from the memory part 6 to the hard disk part 8. Then, the flow returns to the connection symbol B of FIG. 2 (Steps S15 and S16 in FIG. 2).

If the system controller 14 determines in Step S3 of FIG. 2 that the first release switch SW1 11 is off, the system controller 14 determines whether the PWFLAG is set. If it is determined that the PWFLAG is not set, it is determined that the photographing-and-recording operation has so far not been executed, and the flow returns to the connection symbol B of FIG. 2. If it is determined that the PWFLAG is set, the count value of the RECCNT provided in the system controller 14 is checked. If the count value of the RECCNT is not "0", it is determined that the image data remains stored in the memory part 6, and the flow proceeds to the connection symbol C shown in FIG. 2 and a routine for recording image data on the hard disk is executed. If the count value of the RECCNT is "0", it is determined that the image data stored in the memory part 6 has already been transmitted to the hard disk part 8 and recorded on the hard disk. The system controller 14 transmits a standby command to the hard disk unit provided in the hard disk part 8, thereby switching the hard disk unit to the above-described standby mode. Then, the flow returns to the connection symbol A of FIG. 2 (Step S17 to S19 in FIG. 2).

In the above-described first embodiment, the value CTH which indicates the predetermined storable number of exposures associated with the continuous-shooting recording mode is selected to be greater than the value STH which indicates the predetermined storable number of exposures associated with the single-shooting recording mode. However, the value STH may be selected to be greater than the value CTH.

The above description of the first embodiment has been made on the assumption that no use is made of the function of automatically switching the hard disk unit from the active mode to the power save mode or the standby mode if the state of executing none of the data writing operation, the data reading operation and the sector seeking operation continues during the predetermined time when the hard disk unit is in the active mode, as well as that after the hard disk unit has received a command, the hard disk unit immediately switches to a desired mode. However, in the first embodiment, the aforesaid function may be used, in which case the time setting of a timer for counting the time taken to switch the hard disk unit from the active mode to the power save mode or the standby mode may be varied according to each individual photographing operation so that the timer can be operated at an optimum timing during the photographing-and-recording operation.

In the above-described first embodiment, if it is determined that the first release switch SW1 11 is off, the image data stored in the buffer memories M0 to M7 of the memory part 6 are transmitted to the hard disk part 8, and after the transmission of all the image data to the hard disk part 8 has been completed, if it is determined in Step S18 of FIG. 2 that the value of the RECCNT in the system controller 14 has reached "0", the standby command is immediately transmitted to the hard disk unit provided in the hard disk part 8. However, another arrangement may be adopted. For example, after the transmission to the hard disk part 8 of all the image data stored in the buffer memories M0 to M7 provided in the memory part 6 has been completed and the value of the RECCNT in the system controller 14 has reached "0", a check is made as to the operational state of the first release switch SW1 11 and a timer or the like is used to count the time interval during which the first release switch SW1 11 is off. If the off state of the first release switch SW1 11 continues during a predetermined time, the standby command is transmitted to the hard disk unit provided in the hard disk part 8. In addition, the time interval to be counted by the timer may be varied between the continuous-shooting recording mode and the single-shooting recording mode.

As is known, when the hard disk in the hard disk unit is to be initially rotated, control parameters such as rotational servo data for the hard disk are varied according to the state of the hard disk. As a result, there is a case where the start-up time of the hard disk during the initial rotating operation thereof becomes longer than that of the hard disk during the second rotating operation et seqq.

For this reason, the value CTH which indicates the predetermined storable number of exposures associated with the continuous-shooting recording mode and the value STH which indicates the predetermined storable number of exposures associated with the single-shooting recording mode may be varied between the initial rotating operation of the hard disk and the second rotating operation et seqq.

For example, during the second rotating operation et seqq of the hard disk, the values CTH and STH may be selected to be greater than those during the initial rotating operation so that the rotating operation of the hard disk can be started after a greater amount of image data has been stored in the buffer memories M0 to M7 of the memory part 6.

In the above-described first embodiment, the RECCNT, i.e., the count for counting the number of images corresponding to image data stored in the memory part 6, is provided in the system controller 14, and what is the number of images corresponding to image data stored in the buffer memories M0 to M7 of the memory part 6 is detected from the value of the RECCNT and the count value of the RECCNT is compared with the value CTH or STH. However, the number of storable exposures may be detected which indicates how many images correspond to the amount of image data which can be stored in the buffer memories M0 to M7 of the memory part 6, and if it is determined that the number of storable exposures has become less than a predetermined value which is set according to either of the shooting recording modes (i.e., the continuous-shooting recording mode or the single-shooting recording mode), the rotating operation of the hard disk of the hard disk unit may be started. In addition, the predetermined value to be compared with the number of storable exposures may be varied similarly to the values CTH and STH.

As described above, in the first embodiment, image data obtained by digitizing an image signal outputted from the image sensor 3 by turning on the first release switch SW1 11 is stored in the buffer memories M0 to M7 of the memory part 6, and if the image data stored in the buffer memories M0 to M7 reaches a predetermined amount, the rotating operation of the hard disk provided in the hard disk part 8 is started. Accordingly, it is not necessary to hold the hard disk of the hard disk unit in a continuous rotating state during a wait for a photographing-and-recording operation, so that an increase in power consumption can be prevented to provide a saving of electrical energy. Even if a portable, electric power source, such as a battery, is used to supply electricity to the electronic still video system, there is no need to frequently perform battery replacement and it is also possible to perform a stable, continuous-shooting recording operation without causing the buffer memories M0 to M7 of the memory part 6 to overflow and interrupting the continuous-shooting recording operation during the continuous-shooting recording mode. In addition, by varying the aforesaid predetermined amount according to the kind of the shooting recording mode and the operating mode of the hard disk unit provided in the hard disk part 8, it is possible to reduce the time during which the hard disk is made to continuously rotate while waiting for a command.

As is apparent from the above description, in accordance with the first embodiment, it is possible to provide an image signal processing apparatus capable of stably performing continuous recording of an image signal by means of a simple arrangement and with a reduced power consumption.

Figure 3:
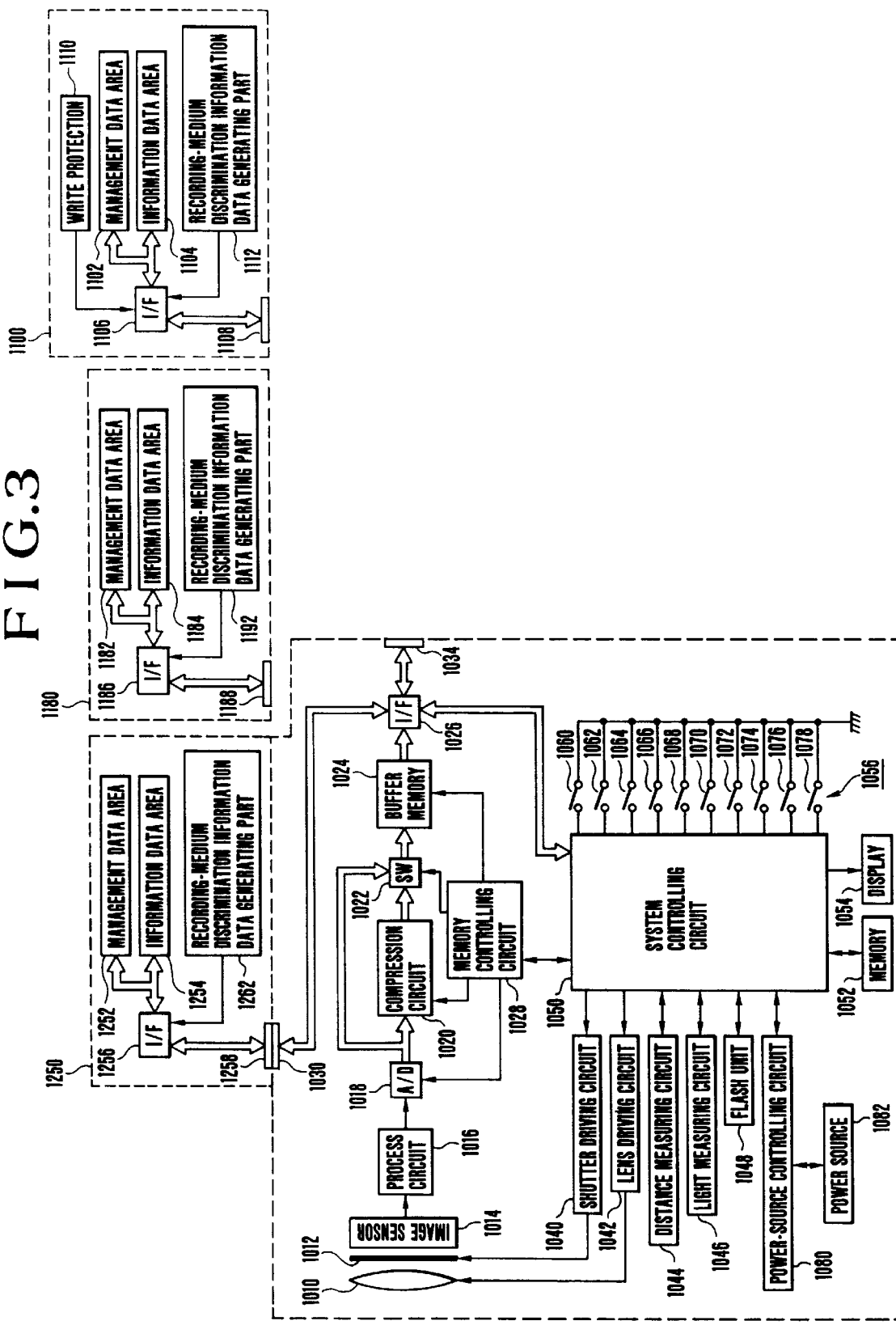
FIG. 3 is a block diagram schematically showing the arrangement of an electronic still camera to which the present invention is applied as a second embodiment thereof.

FIG. 3 is a block diagram schematically showing the arrangement of an electronic still camera to which the present invention is applied as a second embodiment thereof.

The electronic still camera shown in FIG. 3 includes a photographic lens unit 1010, a shutter mechanism 1012 provided with a diaphragm function, an image sensor 1014 for converting an optical image into an electrical signal, a process circuit 1016 for performing known camera-signal processing such as gamma correction, an A/D converter 1018 for converting an analog still image signal outputted from the process circuit 1016 into a digital still image signal, a compression circuit 1020 for compressing a digital still image signal outputted from the A/D converter 1018 in accordance with a data compression method such as adaptive discrete cosine transform (ADCT), and a selecting switch (SW) 1022 for selectively outputting a noncompressed, digital still image signal outputted from the A/D converter 1018 and a compressed, still image signal outputted from the compression circuit 1020.

A memory controlling circuit 1028 is provided for controlling the A/D converter 1018, the compression circuit 1020, the SW 1022 and a buffer memory 1024. If a digital still image signal outputted from the A/D converter 1018 is to be compressed, the compressed, digital still image signal outputted from the compression circuit 1020 is temporarily written into the buffer memory 1024 under control of the memory controlling circuit 1028. If no compression of such digital still image signal is needed, the digital still image signal outputted from the A/D converter 1018 is written into the buffer memory 1024 under control of the memory controlling circuit 1028.

As shown, the electronic still camera also includes an interface (I/F) 1026 for establishing communication with a memory card 1100, a hard disk unit 1180 or a hard disk unit 1250, a connector 1030 for providing connection with the memory card 1100 or the hard disk unit 1180 or 1250, and a connector 1034 for permitting transmission of a digital, still image signal to external equipment such as a printer having, for example, a digital-signal input terminal.

The shown electronic still camera also includes a lens driving circuit 1042 for driving a focusing lens provided in the photographic lens unit 1010, a shutter driving circuit 1040 for driving the shutter mechanism 1012, a distance measuring circuit 1044 for measuring the distance to a subject, a light measuring circuit 1046 for measuring the luminance of the subject, and a flash unit 1048.

The shown electronic still camera includes a system controlling circuit 1050 for controlling the entire apparatus, a memory 1052 in which various data are stored, such as the constants and variables required for the controlling operation of the system controlling circuit 1050, and a display device 1054, such as a liquid-crystal display, for displaying the operational state and the like of the electronic still camera.

The shown electronic still camera includes a switch group 1056 which is operated to input various operational instructions into the system controlling circuit 1050. The switch group 1056 includes, for example, a main switch 1060, a distance·light measuring switch 1062 arranged to be closed by a first stroke of a two-stroke release switch (not shown) to specify execution of a distance measurement by the distance measuring circuit 1046 and execution of a light measurement by the light measuring circuit 1048, a recording starting switch 1064 arranged to be closed by a second stroke of the two-stoke release switch to specify starting of a recording operation for recording a photographed still image signal by means of the memory card 1100 or the hard disk unit 1180 or 1250, a shooting-recording-mode selecting switch 1066 for selecting a desired shooting recording mode from among a single-shooting recording (S) mode for executing a photographic operation corresponding to one picture and recording a field or frame still image signal for the one picture, a continuous-shooting recording (C) mode for continuously executing photographic operations corresponding to a plurality of pictures and recording field or frame still image signals for the plurality of pictures, and a self-timer photography recording mode, a recording-condition setting switch 1068 for selecting various setting conditions associated with the operation of recording a still image signal, such as the number of pictures to be recorded each of which pictures is made from a photographed still image signal, the discrimination between frame recording and field recording, the aspect ratio of a still image, the pixel arrangement of the still image, a data compression method, and the compression ratio at which data is compressed by the data compression method, an erase mode selecting switch 1070 for selecting an erase mode, and a start-of-erasure specifying switch 1072 for specifying the starting of an erasing operation.

The shown electronic still camera also includes a power-source controlling circuit 1080 for performing detection or control of the state of supply of electric power from a power source 1082, and the power source 1082. The power source 1082 is made up of elements such as a battery, a DC/DC converter and a switch for selecting a block with which communication is to be established, and is controlled by the power-source controlling circuit 1080.

The power-source controlling circuit 1080 detects the presence or absence of an attached battery, the kind of the attached battery and the amount of power remaining in the attached battery, and controls the power source 1082 in accordance with the result of the detection and an instruction supplied from the system controlling circuit 1050.

The system controlling circuit 1050 causes the lens driving circuit 1042 to drive the focusing lens of the photographic lens unit 1010 on the basis of a measurement result provided by the distance measuring circuit 1044, thereby controlling the photographic lens unit 1010 so that it can move to an in-focus position. In addition, the system controlling circuit 1050 causes the shutter driving circuit 1040 to drive the shutter mechanism 1012 so that the amount of exposure of a subject optical image formed on the imaging surface of the image sensor 1014 is optimized, on the basis of a measurement result provided by the light measuring circuit 1046. Thus, exposure control by the shutter mechanism 1012 is performed.

The memory card 1100 includes a memory device having a recording area formed by a management data area 1102 and an information data area 1104, and data is inputted from the outside to the management data area 1102 or the information data area 1104 or is outputted from the management data area 1102 or the information data area 1104 to the outside, through an I/F 1106 and a connector 1108.

Inhibition of data writing to the memory card 1100 can be specified through, for example, a switch (not shown), and the memory card 1100 has a data-writing information data generating part (write protection) 1110 for generating information data indicative of data-writing inhibition in accordance with an instruction specified through the switch. The information data generated from the write protection 1110 is also outputted to the outside through the I/F 1106 and the connector 1108.

The memory card 1100 further has a recording-medium discrimination information data generating part 1112. Recording-medium discrimination data indicative of the kind, characteristics and the like of a recording medium is generated from the recording-medium discrimination information data generating part 1112 and outputted to the outside through the I/F 1106 and the connector 1108. The system controlling circuit 1050 detects whether a device connected to the connector 1030 is the memory card 1100 from the recording-medium discrimination information data.

The I/F 1106 includes constituent elements, such as a control circuit such as a CPU or an MPU, a nonvolatile memory such as a ROM or an EEPROM, and a RAM, and executes control of the memory card 1100 on the basis of a predetermined program stored in the nonvolatile memory.

The hard disk unit 1180 includes a hard disk having a recording area formed by a management data area 1182 and an information data area 1184, and data is inputted from the outside to the management data area 1182 or the information data area 1184 or is outputted from the management data area 1182 or the information data area 1184 to the outside, through an I/F 1186 and a connector 1188.

The hard disk unit 1180 further has a recording-medium discrimination information data generating part 1192. Recording-medium discrimination data indicative of the kind, characteristics and the like of a recording medium is generated from the recording-medium discrimination information data generating part 1192 and outputted to the outside through the I/F 1186 and the connector 1188. The system controlling circuit 1050 detects whether a device connected to the connector 1030 is the hard disk unit 1180 from the recording-medium discrimination information data.

The I/F 1186 includes constituent elements, such as a control circuit such as a CPU or an MPU, a nonvolatile memory such as a ROM or an EEPROM, and a RAM, and executes control of the hard disk unit 1180 on the basis of a predetermined program stored in the nonvolatile memory.

The hard disk unit 1250 includes a hard disk having a recording area formed by a management data area 1252 and an information data area 1254, and data is inputted from the outside to the management data area 1252 or the information data area 1254 or is outputted from the management data area 1252 or the information data area 1254 to the outside, through an I/F 1256 and a connector 1258.

The hard disk unit 1250 further has a recording-medium discrimination information data generating part 1262. Recording-medium discrimination data indicative of the kind, characteristics and the like of a recording medium is generated from the recording-medium discrimination information data generating part 1262 and outputted to the outside through the I/F 1256 and the connector 1258. The system controlling circuit 1050 detects whether a device connected to the connector 1030 is the hard disk unit 1250 from the recording-medium discrimination information data.

The I/F 1256 includes constituent elements, such as a control circuit such as a CPU or an MPU, a nonvolatile memory such as a ROM or an EEPROM, and a RAM, and executes control of the hard disk unit 1250 on the basis of a predetermined program stored in the nonvolatile memory.

In the second embodiment, the hard disk unit 1250 has a large-size hard disk which is large in diameter, mass and rotational moment, and a long start-up time is taken until the rotation of the hard disk reaches its full speed and the power consumption required during the start-up time is large. In contrast, the hard disk unit 1180 has a small-size hard disk which is small in diameter, mass and rotational moment, and the start-up time taken until the rotation of the hard disk reaches the full speed is short and the power consumption required during the start-up time is small.

The operation of the electronic still video camera, shown in FIG. 3, according to the second embodiment of the present invention will be described below with reference to the flowcharts shown in FIGS. 4 through 8.

Figure 4:
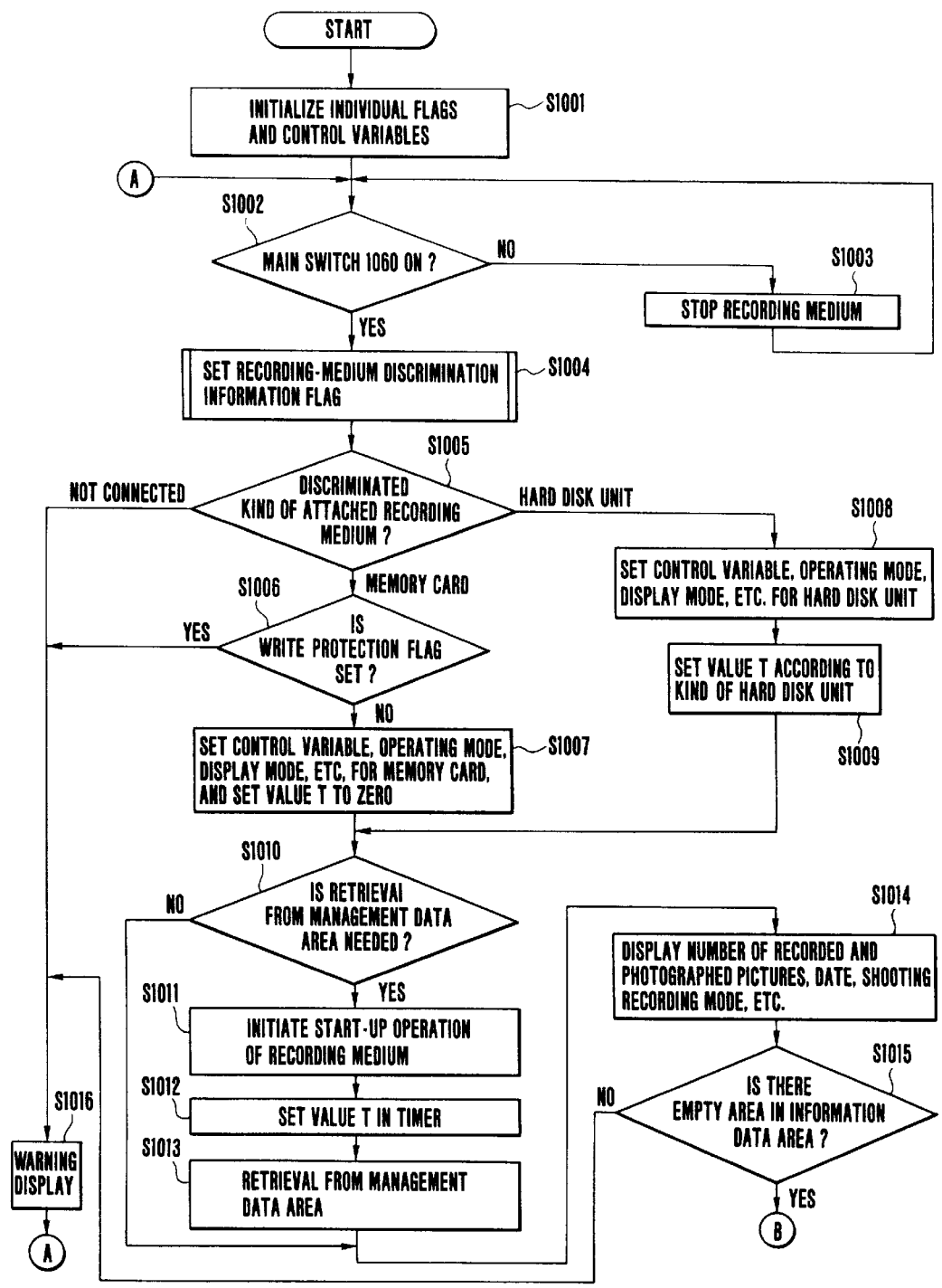
FIG. 4 is a part of a flowchart showing the main operating routine of the electronic still video camera shown in FIG. 3.
Figure 5:
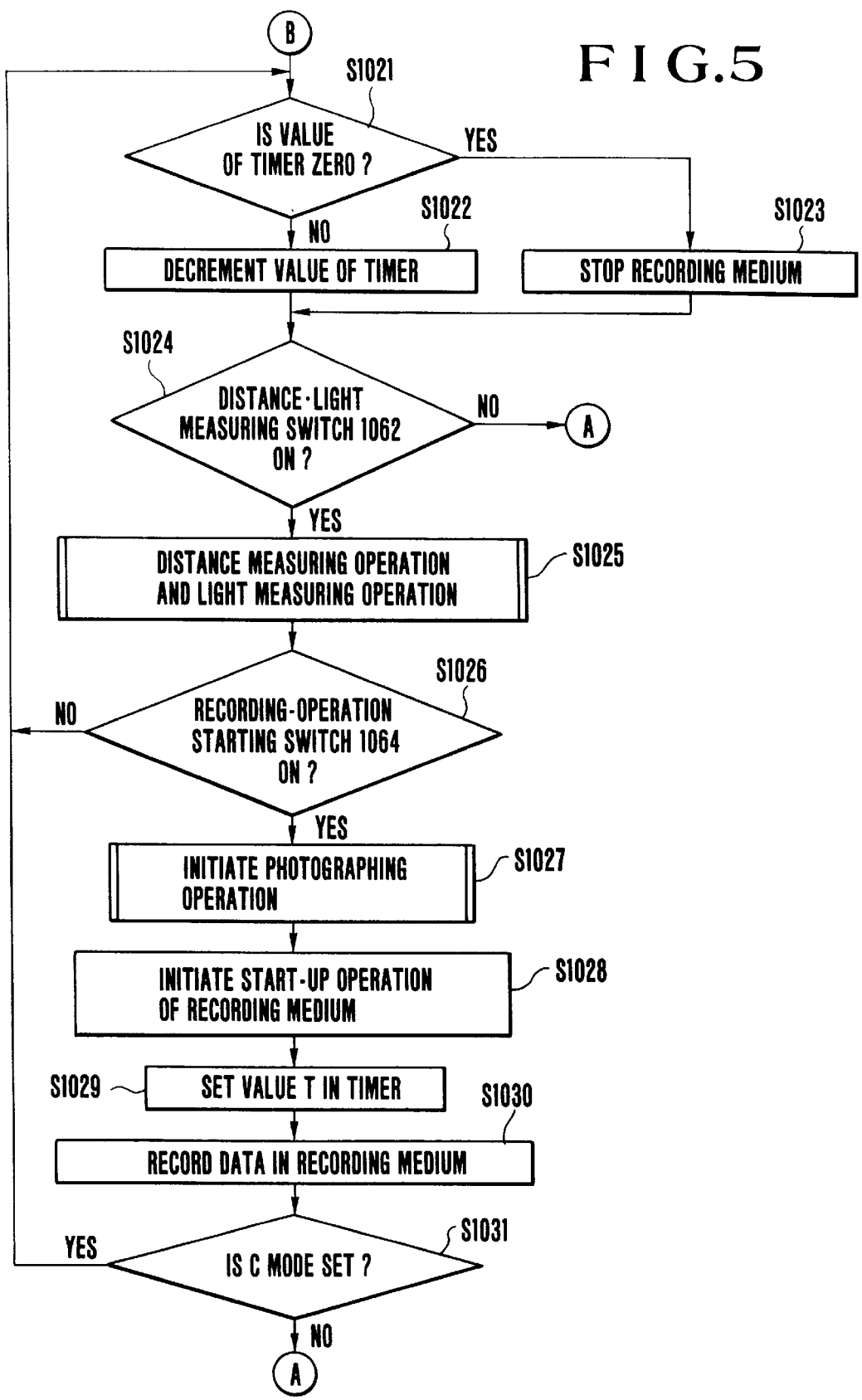
FIG. 5 is a part of the flowchart showing the main operating routine of the electronic still video camera shown in FIG. 3.

FIGS. 4 and 5 are flowcharts showing the main operating routine of the entire electronic still video camera shown in FIG. 3.

Referring to FIGS. 4 and 5, when the battery of the power source 1082 is attached to the camera body of the electronic still video camera, the system controlling circuit 1050 initializes various flags and control variables (Step S1001 in FIG. 4). Thereafter, if the main switch 1060 is off (Step S1002 in FIG. 4), the operation of stopping a recording medium attached to the camera body is executed (Step S1003 in FIG. 4).

The operation of stopping the recording medium is performed as follows. For example, if the recording medium is a hard disk unit, after its data writing/reading head (not shown) has been retracted, the rotation of its hard disk (not shown) is stopped and the amount of supply of electric power is limited as required. If the recording medium is a memory card, it is not necessary to perform such a mechanical stopping operation, and an electrical stopping operation is performed, as by limiting the amount of supply of electric power as required.

If it is determined in Step S1002 that the main switch 1060 is on, it is determined which of the memory card 1100, the hard disk unit 1180 and the hard disk unit 1250 is attached to the camera body, and a recording-medium discrimination information flag is set (Step S1004 in FIG. 4).

The operation of discriminating among the kinds of such recording media will be described in detail below.

If it is determined that the recording-medium discrimination information flag which has been set in Step S1004 through the operation of executing discrimination as to the kind of a recording medium indicates a hard disk unit (Step S1005 in FIG. 4), the system controlling circuit 1050 switches settings associated with the control variables, the operating mode, a display mode and so on in accordance with the kind of the hard disk unit (that is, in accordance with which of the hard disk unit 1180 and the hard disk unit 1250 is attached) (Step S1008 in FIG. 4). Then, the system controlling circuit 1050 sets a value T which determines the rotating-operation continuation time of the hard disk of the hard disk unit, according to the recording-medium discrimination information flag (Step S1009 in FIG. 4).

For example, regarding a hard disk unit such as the hard disk unit 1250 provided with the large-size hard disk which is large in diameter, mass and rotational moment, and which takes a long start-up time to reach its full rotational speed and also requires a large power consumption during the start-up time, it is preferable not to frequently repeat the start-up and stopping operations of the hard disk. For this reason, in the case of such a large-size hard disk, if the hard disk is started up once, it is held in its continuous rotating state during a certain time interval, whereby it is possible to effectively suppress power consumption owing to the continuous rotating operation of the hard disk. Accordingly, the value T which determines the rotating-operation continuation time of the hard disk is set to a large value.

Regarding a hard disk unit such as the hard disk unit 1180 provided with the small-size hard disk which is small in diameter, mass and rotational moment, and which takes a short start-up time to reach its full rotational speed and also requires a small power consumption during the start-up time, it is possible to effectively suppress power consumption by stopping the rotating operation of the hard disk, if unnecessary, within a comparatively short time after the hard disk has been started up. Accordingly, in the case of the small-size hard disk, the value T which determines the rotating-operation continuation time of the hard disk is set to a small value. In the above-described manner, the stopping operation of the hard disk unit attached to the camera body can be optimumly executed according to the kind of the hard disk unit.

If it is determined that the recording-medium discrimination information flag indicates a memory card (Step S1005 in FIG. 4), it is determined whether a write protection flag is set, the write protection flag being set in accordance with the information data indicative of data-writing inhibition which is outputted from the write protection 1110 of the memory card 1100 (Step S1006 in FIG. 4). If it is determined that the write protection flag is set, the display device 1054 is made to provide a warning display indicating that the memory card 1100 attached to the camera body is placed in its data-writing inhibit state, and the flow returns to Step S1002 (Step S1016 in FIG. 4). If it is determined in Step S1006 that the write protection flag is not set, the settings which are associated with the control variables, the operating mode, the display mode and so on are switched according to the memory card 1100 and the value T which determines the rotating-operation continuation time of the hard disk of the aforesaid hard disk unit is set to zero (Step S1007 in FIG. 4).

In the operation of executing discrimination as to the kind of the recording medium, executed in Step S1004, if the recording-medium discrimination information flag does not indicate the memory card nor the hard disk unit and it is determined that no recording medium is attached to the camera body (Step S1005 in FIG. 4), the display device 1054 is made to provide a warning display indicating that no recording medium is attached to the camera body, and the flow returns to Step S1002 (Step S1016 in FIG. 4).

If it is necessary to execute retrieval from a management data area provided in the recording medium attached to the camera body (Step S1010 in FIG. 4), the system controlling circuit 1050 initiates a start-up operation of the recording medium (Step S1011 in FIG. 4) and sets a timer (not shown) provided in the system controlling circuit 1050 to the value T which determines the rotating-operation continuation time of the hard disk of the hard disk unit, which time has been set in Step S1007 or S1009 (Step S1012 in FIG. 4). Then, the system controlling circuit 1050 executes retrieval of management data recorded in the management data area of the started-up recording medium (Step S1013 in FIG. 4).

The aforesaid start-up operation is performed as follows. For example, if the recording medium attached to the camera body is the hard disk unit, the electric power required to start up the hard disk is supplied to rotate the hard disk and the data writing/reading head (not shown) is set to its drivable state. If the recording medium attached to the camera body is the memory card, it is not necessary to perform such a mechanical start-up operation, and an electrical start-up operation is performed, as by supplying the electric power required for the start-up operation.

Then, the system controlling circuit 1050 causes the display device 1054 to visually display the number of photographed pictures recorded by using the recording medium, the date of photography and the associated shooting recording. mode on the basis of the management data recorded in the management data area of the recording medium in the above-described manner, various kinds of modes which are selectively set by the switch group 1056 and various kinds of modes which are selectively set according to the recording-medium discrimination information flag in Step S1007 or S1009 (Step S1014 in FIG. 4).

If there is no recordable empty area in the information data area 1104 of the memory card 1100, the information data area 1184 of the hard disk unit 1180 or the information data area 1254 of the hard disk unit 1250 (Step S1015 in FIG. 4), the display device 1054 is made to provide a warning display indicating that there is no recordable empty area in the information data area of the recording medium, and the flow returns to Step S1002 (Step S1016 in FIG. 4).

Then, it is determined whether the value indicated by the timer provided in the system controlling circuit 1050 is zero, the timer being set to the value T which determines the rotating-operation continuation time of the hard disk of the aforesaid hard disk unit in Step S1012 in the above-described manner (Step S1021 in FIG. 5). If it is determined that the value of the timer is zero, it is determined that the recording medium attached to the camera body is the memory card or that the recording medium attached to the camera body is the hard disk and the rotating-operation continuation time, set in Step S1012, of the hard disk of the hard disk unit has elapsed, the stopping operation of the recording medium is executed in a manner similar to that used in Step S1003 (Step S1023 in FIG. 5). If it is determined that the value of the timer is not zero, it is determined that the recording medium attached to the camera body is not the memory card but the hard disk unit and that the rotating-operation continuation time, set in Step S1012, of the hard disk of the hard disk unit has not yet elapsed, the value of the timer is decremented, and no stopping operation of the recording medium is executed and the rotation of the hard disk is continued (Step S1022 in FIG. 5).

Then, the system controlling circuit 1050 detects the state of the distance·light measuring switch 1062. If the distance·light measuring switch 1062 is off, the flow returns to Step S1002 (Step S1024 in FIG. 5). If the distance·light measuring switch 1062 is on, the system controlling circuit 1050 causes the distance measuring circuit 1044 to measure the distance to a subject and then causes the lens driving circuit 1042 to drive the focusing lens of the photographic lens unit 1010 on the basis of the result of the distance measurement executed by the distance measuring circuit 1044, thereby focusing the photographic lens unit 1010 onto the subject. In addition, the system controlling circuit 1050 causes the light measuring circuit 1046 to measure the luminance of the subject and, on the basis of the result of the light measurement executed by the light measuring circuit 1046, causes the shutter driving circuit 1040 to drive the shutter mechanism 1012 so that the subject optical image formed on the imaging surface of the image sensor 1014 achieves an optimum amount of exposure, thereby determining the amount of exposure of the subject by means of the shutter mechanism 1012 (Step S1025 in FIG. 5).

Then, the system controlling circuit 1050 detects the state of the recording starting switch 1064, and the distance measuring operation and the light measuring operation are repeated until the recording starting switch 1064 is turned on (Step S1026 in FIG. 5). If it is determined that the recording starting switch 1064 is turned on, the system controlling circuit 1050 initiates a photographing operation (Step S1027 in FIG. 5).

The aforesaid distance measuring operation, light measuring operation and photographing operation will be described in detail later.

After the photographing operation for one picture has been completed in the above-described manner, the system controlling circuit 1050 executes a start-up operation of the recording medium similarly to Step S1011 (Step S1028 in FIG. 5), and sets the value T set in Step S1007 or S1009 in the timer provided in the system controlling circuit 1050 (Step S1029 in FIG. 5). Then, the system controlling circuit 1050 reads data temporarily stored in the buffer memory 1024 and records, through the I/F 1026 and the connector 1030, the data read from the buffer memory 1024 into the information data area of the recording medium attached to the camera body and management data corresponding to the photographed image (i.e., the image data recorded in the information data area) into the management data area of the recording medium (Step S1030 in FIG. 5).

If the memory card 1100 is connected to the connector 1030 of the camera body, the data read from the buffer memory 1024 is recorded into the information data area 1104 through the I/F 1026, the connector 1030 as well as the connector 1108 and the I/F 1106 of the memory card 1100, while management data corresponding to the photographed image (i.e., the image data recorded in the information data area 1104) is recorded into the management data area 1102. If the hard disk unit 1180 is connected to the connector 1030 of the camera body, the data read from the buffer memory 1024 is recorded into the information data area 1184 through the I/F 1026, the connector 1030 as well as the connector 1188 and the I/F 1186 of the hard disk unit 1180, while management data corresponding to the photographed image (i.e., the image data recorded in the information data area 1184) is recorded into the management data area 1182. If the hard disk unit 1250 is connected to the connector 1030 of the camera body, the data read from the buffer memory 1024 is recorded into the information data area 1254 through the I/F 1026, the connector 1030 as well as the connector 1258 and the I/F 1256 of the hard disk unit 1250, while management data corresponding to the photographed image (i.e., the image data recorded in the information data area 1254) is recorded into the management data area 1252.

Then, if the C mode is set by the shooting-recording-mode selecting switch 1066 to continue the photographing operation, the flow returns to Step S1021 and a processing operation similar to the above-described one is repeated. If a series of photographing and recording operations is completed, the flow returns to Step S1002 (Step S1031 in FIG. 5).

Figure 9:
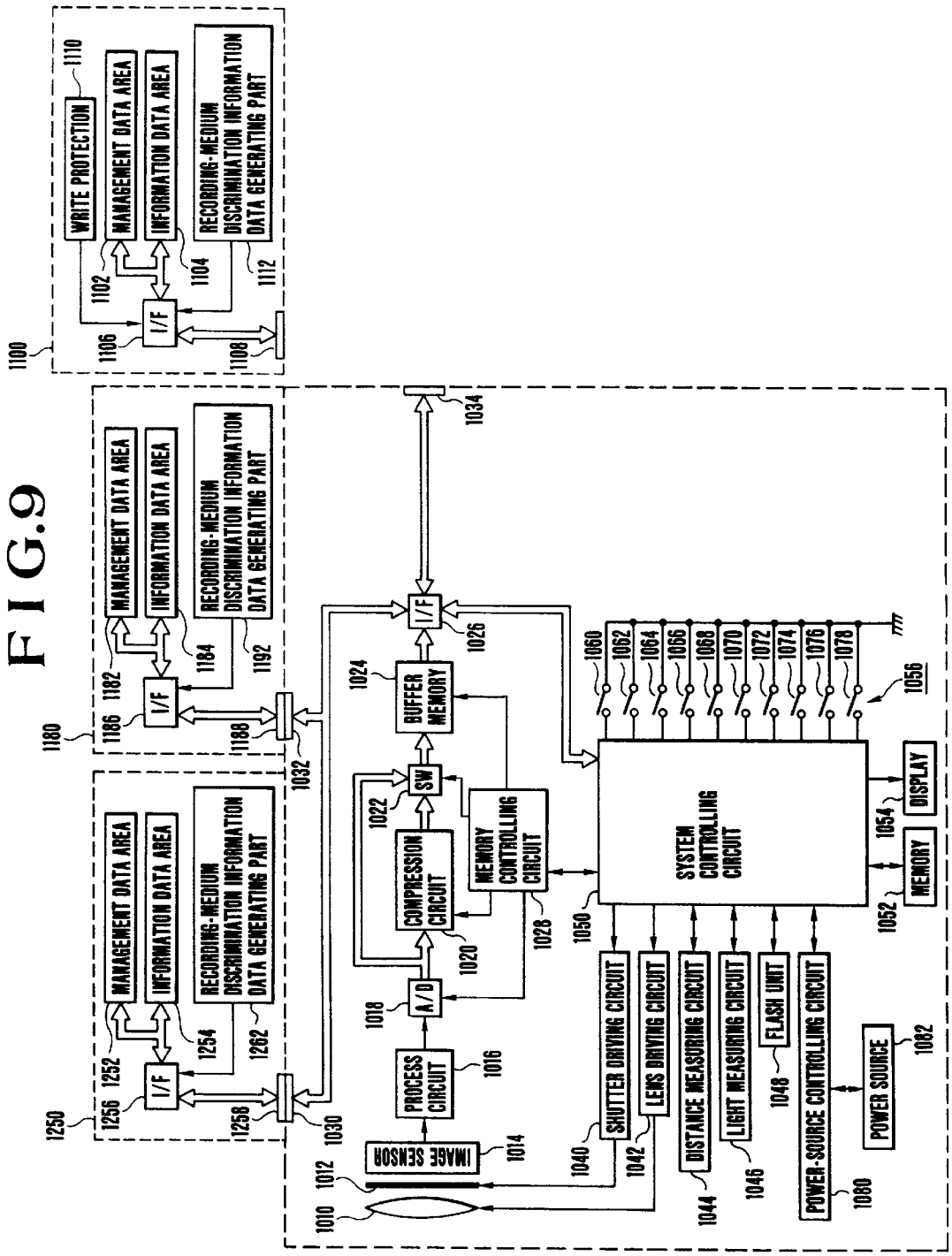
FIG. 9 is a block diagram schematically showing the arrangement of an electronic still video camera to which the present invention is applied as a third embodiment thereof.

FIG. 9 is a block diagram schematically showing the arrangement of an electronic still video camera to which the present invention is applied as a third embodiment thereof.

In FIG. 9, reference numeral 1032 denotes a connector for providing connection with the memory card 1100, the hard disk unit 1180 or 1250, and the same reference numerals are used to denote constituent elements similar to those shown in FIG. 3 and detailed description thereof is omitted.

The operation of the electronic still video camera, shown in FIG. 9, according to the third embodiment of the present invention will be described below with reference to the flowcharts shown in FIGS. 5 through 8 and FIG. 10

Figure 10:
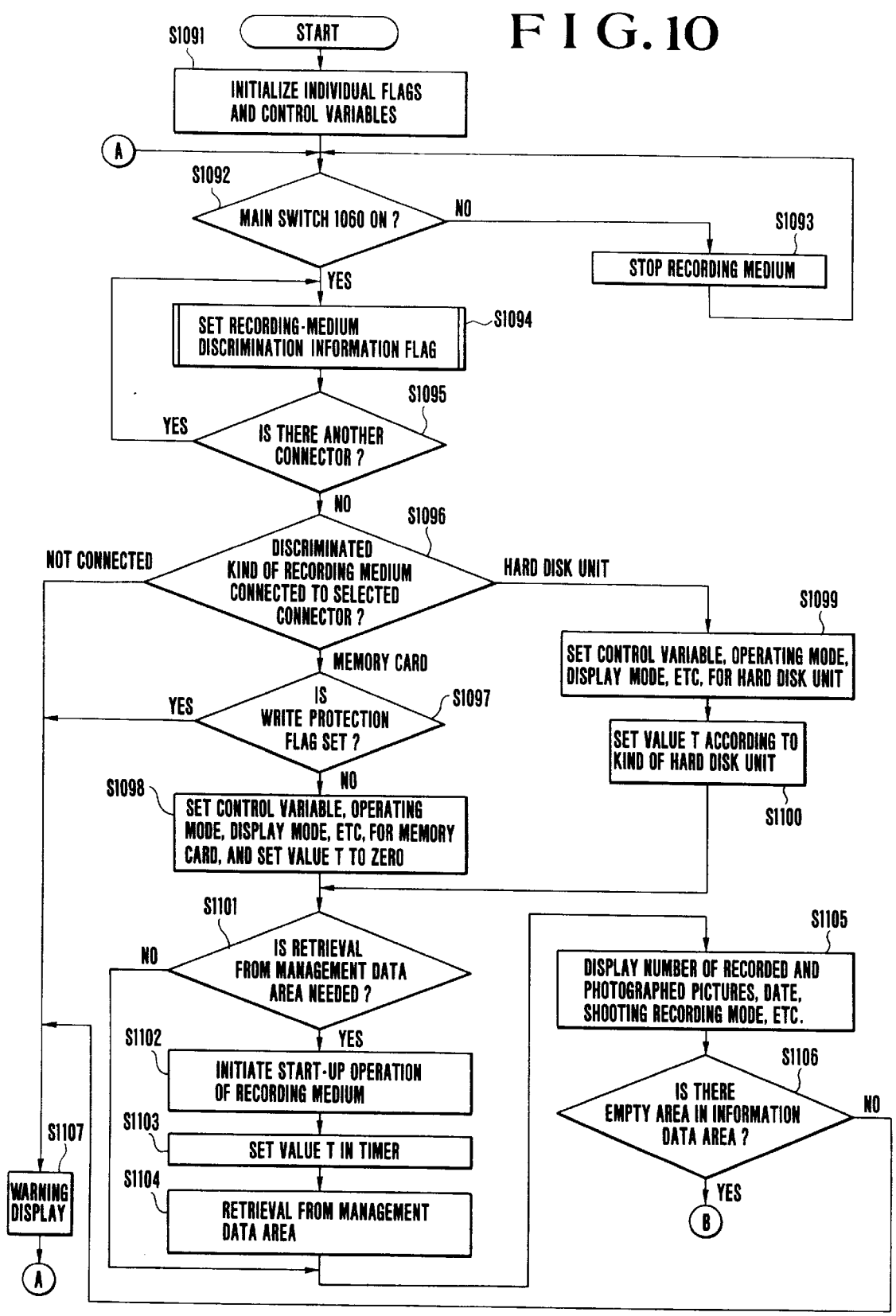
FIG. 10 is a part of a flowchart showing the main operating routine of the electronic still video camera shown in FIG. 9.

FIGS. 10 and 5 are flowcharts showing the main operating routine of the entire electronic still video camera shown in FIG. 9.

Referring to FIGS. 10 and 5, when the battery of the power source 1082 is attached to the camera body of the electronic still video camera, the system controlling circuit 1050 initializes the various flags and the control variables (Step S1091 in FIG. 10). Thereafter, if the main switch 1060 is off (Step S1092 in FIG. 10), the operation of stopping a recording medium attached to the camera body is executed (Step S1093 in FIG. 10).

The operation of stopping the recording medium is performed as follows. For example, if the recording medium is a hard disk unit, after its data writing/reading head (not shown) has been retracted, the rotation of its hard disk (not shown) is stopped and the amount of supply of electric power is limited as required. If the recording medium is a memory card, it is not necessary to perform such a mechanical stopping operation, and an electrical stopping operation is performed, as by limiting the amount of supply of electric power as required.

If it is determined in Step S1092 that the main switch 1060 is on, it is determined which of the memory card 1100, the hard disk unit 1180 and the hard disk unit 1250 is connected to the connector 1030, and the recording-medium discrimination information flag is set (Step S1094 in FIG. 10).

The operation of executing discrimination as to the kind of each of the recording media will be described in detail later.

Then, the system controlling circuit 1050 detects whether a recording medium is connected to a connector other than the connector 1030 (i.e., the connector 1032 in the embodiment shown in FIG. 9). If a recording medium is connected to the connector 1032, it is determined which of the memory card 1100, the hard disk unit 1180 and the hard disk unit 1250 is connected to the connector 1032, and the recording-medium discrimination information flag is set (Steps S1095 and S1094 in FIG. 10).

If three or more connectors are provided on the camera body, discrimination as to the state of connection of a recording medium to each of the connectors and discrimination as to the kind of a connected recording medium may be executed at the same time.

After the completion of the discrimination as to the kind of the recording media connected to each of the connectors provided on the camera body (Step S1095 in FIG. 10), the system controlling circuit 1050 selects one connector from among the plurality of connectors provided on the camera body and confirms which of the memory card 1100, the hard disk unit 1180 and the hard disk unit 1250 is connected to the selected connector by making reference to the recording-medium discrimination information flag which has been set in Steps S1095 (Step S1096 in FIG. 10).

If it is determined that the recording-medium discrimination information flag which has been set in Step S1095 through the operation of executing discrimination as to the kind of the recording medium indicates that a hard disk unit is connected to the selected connector (Step S1096 in FIG. 10), the system controlling circuit 1050 switches the settings associated with the control variables, the operating mode, the display mode and so on in accordance with the kind of the hard disk unit (that is, in accordance with which of the hard disk unit 1180 and the hard disk unit 1250 is connected) (Step S1099 in FIG. 10). Then, the system controlling circuit 1050 sets the value T which determines the rotating-operation continuation time of the hard disk of the hard disk unit, according to the recording-medium discrimination information flag (Step S1100 in FIG. 10).

For example, regarding a hard disk unit such as the hard disk unit 1250 provided with the large-size hard disk which is large in diameter, mass and rotational moment, and which takes a long start-up time to reach its full rotational speed and also requires a large power consumption during the start-up time, it is preferable not to frequently repeat the start-up and stopping operations of the hard disk. For this reason, in the case of such a large-size hard disk, if the hard disk is started up once, it is held in its continuous rotating state during a certain time interval, whereby it is possible to effectively suppress power consumption owing to the continuous rotating operation of the hard disk. Accordingly, the value T which determines the rotating-operation continuation time of the hard disk is set to a large value.

Regarding a hard disk unit such as the hard disk unit 1180 provided with the small-size hard disk which is small in diameter, mass and rotational moment, and which takes a short start-up time to reach its full rotational speed and also requires a small power consumption during the start-up time, it is possible to effectively suppress power consumption by stopping the rotating operation of the hard disk, if unnecessary, within a comparatively short time after the hard disk has been started up. Accordingly, in the case of the small-size hard disk, the value T which determines the rotating-operation continuation time of the hard disk is set to a small value. In the above-described manner, the stopping operation of the hard disk unit attached to the camera body can be optimumly executed according to the kind of the hard disk unit.

If it is determined that the recording-medium discrimination information flag which has been set in Step S1095 through the operation of executing discrimination as to the kind of the recording medium indicates that a memory card is connected to the selected connector (Step S1096 in FIG. 10), it is determined whether the write protection flag is set, the write protection flag being set in accordance with the information data indicative of data-writing inhibition which is outputted from the write protection 1110 of the memory card 1100 (Step S1097 in FIG. 10). If it is determined that the write protection flag is set, the display device 1054 is made to provide a warning display indicating that the memory card 1100 connected to the selected connector is placed in its data-writing inhibit state, and the flow returns to Step S1092 (Step S1107 in FIG. 10). If it is determined in Step S1097 that the write protection flag is not set, the settings which are associated with the control variables, the operating mode, the display mode and so on are switched according to the memory card 1100 and the value T which determines the rotating-operation continuation time of the hard disk of the aforesaid hard disk unit is set to zero (Step S1098 in FIG. 10).

In the operation of executing discrimination as to the kind of the recording medium, executed in Step S1095, if the recording-medium discrimination information flag does not indicate the memory card nor the hard disk unit and it is determined that no recording medium is connected to the selected connector (Step S1096 in FIG. 10), the display device 1054 is made to provide a warning display indicating that no recording medium is connected to the selected connector, and the flow returns to Step S1092 (Step S1107 in FIG. 10).

If it is necessary to execute retrieval from a management data area provided in the recording medium connected to the selected connector (Step S1101 in FIG. 10), the system controlling circuit 1050 initiates a start-up operation of the recording medium (Step S1102 in FIG. 10) and sets the timer (not shown) provided in the system controlling circuit 1050 to the value T which determines the rotating-operation continuation time of the hard disk of the hard disk unit, which time has been set in Step S1098 or S1099 (Step S1103 in FIG. 10). Then, the system controlling circuit 1050 executes retrieval of management data recorded in the management data area of the started-up recording medium (Step S1104 in FIG. 10).

The aforesaid start-up operation is performed as follows. For example, if the recording medium connected to the selected connector is the hard disk unit, the electric power required to start up the hard disk is supplied to rotate the hard disk and the data writing/reading head (not shown) is set to its drivable state. If the recording medium connected to the selected connector is the memory card, it is not necessary to perform such a mechanical start-up operation, and an electrical start-up operation is performed, as by supplying the electric power required for the start-up operation.

Then, the system controlling circuit 1050 causes the display device 1054 to visually display the number of photographed pictures recorded by using the recording medium, the date of photography and the associated shooting recording mode on the basis of the management data recorded in the management data area of the recording medium in the above-described manner, the various kinds of modes which are selectively set by the switch group 1056 and various kinds of modes which are selectively set according to the recording-medium discrimination information flag in Step S1098 or S1099 (Step S1105 in FIG. 10).

If there is no recordable empty area in the information data area 1104 of the memory card 1100, the information data area 1184 of the hard disk unit 1180 or the information data area 1254 of the hard disk unit 1250 (Step S1106 in FIG. 10), the display device 1054 is made to provide a warning display indicating that there is no recordable empty area in the information data area of the recording medium, and the flow returns to Step S1092 (Step S1107 in FIG. 10).

Then, it is determined whether the value indicated by the timer provided in the system controlling circuit 1050 is zero, the timer being set to the value T which determines the rotating-operation continuation time of the hard disk of the aforesaid hard disk unit in Step S1103 in the above-described manner (Step S1021 in FIG. 5). If it is determined that the value of the timer is zero, it is determined that the recording medium connected to the selected connector is the memory card or that the recording medium connected to the selected connector is the hard disk and the rotating-operation continuation time, set in Step S1103, of the hard disk of the hard disk unit has elapsed, the stopping operation of the recording medium is executed in a manner similar to that used in Step S1093 (Step S1023 in FIG. 5). If it is determined that the value of the timer is not zero, it is determined that the recording medium connected to the selected connector is not the memory card but the hard disk unit and that the rotating-operation continuation time, set in Step S1103, of the hard disk of the hard disk unit has not yet elapsed, the value of the timer is decremented, and no stopping operation of the hard disk unit is executed and the rotation of the hard disk is continued (Step S1022 in FIG. 5).

Then, the system controlling circuit 1050 detects the state of the distance-light measuring switch 1062. If the distance-light measuring switch 1062 is off, the flow returns to Step S1092 (Step S1024 in FIG. 5). If the distance-light measuring switch 1062 is on, the system controlling circuit 1050 causes the distance measuring circuit 1044 to measure the distance to a subject and then causes the lens driving circuit 1042 to drive the focusing lens of the photographic lens unit 1010 on the basis of the result of the distance measurement executed by the distance measuring circuit 1044, thereby focusing the photographic lens unit 1010 onto the subject. In addition, the system controlling circuit 1050 causes the light measuring circuit 1046 to measure the luminance of the subject and, on the basis of the result of the light measurement executed by the light measuring circuit 1046, causes the shutter driving circuit 1040 to drive the shutter mechanism 1012 so that the subject optical image formed on the imaging surface of the image sensor 1014 achieves an optimum amount of exposure, thereby determining the amount of exposure of the subject by means of the shutter mechanism 1012 (Step S1025 in FIG. 5).

Then, the system controlling circuit 1050 detects the state of the recording starting switch 1064, and the distance measuring operation and the light measuring operation are repeated until the recording starting switch 1064 is turned on (Step S1026 in FIG. 5). If it is determined that the recording starting switch 1064 is turned on, the system controlling circuit 1050 initiates a photographing operation (Step S1027 in FIG. 5).

The aforesaid distance measuring operation, light measuring operation and photographing operation will be described in detail later.

After the photographing operation for one picture has been completed in the above-described manner, the system controlling circuit 1050 executes a start-up operation of the recording medium similarly to Step S1102 (Step S1028 in FIG. 5), and sets the value T set in Step S1098 or S1100 in the timer provided in the system controlling circuit 1050 (Step S1029 in FIG. 5). Then, the system controlling circuit 1050 reads data temporarily stored in the buffer memory 1024 and records, through the I/F 1026 and the connector 1030 or 1032, the data read from the buffer memory 1024 into the information data area of the recording medium connected to the selected connector, while management data corresponding to the photographed image (i.e., the image data recorded in the information data area) into the management data area of the recording medium (Step S1030 in FIG. 5).

If the memory card 1100 is connected to the connector 1030 or 1032 of the camera body, the data read from the buffer memory 1024 is recorded into the information data area 1104 through the I/F 1026, the connector 1030 or 1032 as well as the connector 1108 and the I/F 1106 of the memory card 1100, while management data corresponding to the photographed image (i.e., the image data recorded in the information data area 1104) is recorded into the management data area 1102. If the hard disk unit 1180 is connected to the connector 1030 or 1032 of the camera body, the data read from the buffer memory 1024 is recorded into the information data area 1184 through the I/F 1026, the connector 1030 or 1032 as well as the connector 1188 and the I/F 1186 of the hard disk unit 1180, while management data corresponding to the photographed image (i.e., the image data recorded in the information data area 1184) is recorded into the management data area 1182. If the hard disk unit 1250 is connected, the data read from the buffer memory 1024 is recorded into the information data area 1254 through the I/F 1026, the connector 1030 or 1032 as well as the connector 1258 and the I/F 1256 of the hard disk unit 1250, while management data corresponding to the photographed image (i.e., the image data recorded in the information data area 1254) is recorded into the management data area 1252.

Then, if the C mode is set by the shooting-recording-mode selecting switch 1066 to continue the photographing operation, the flow returns to Step S1021 and a processing operation similar to the above-described one is repeated. If a series of photographing and recording operations is completed, the flow returns to Step S1092 (Step S1031 in FIG. 5).

Figure 6:
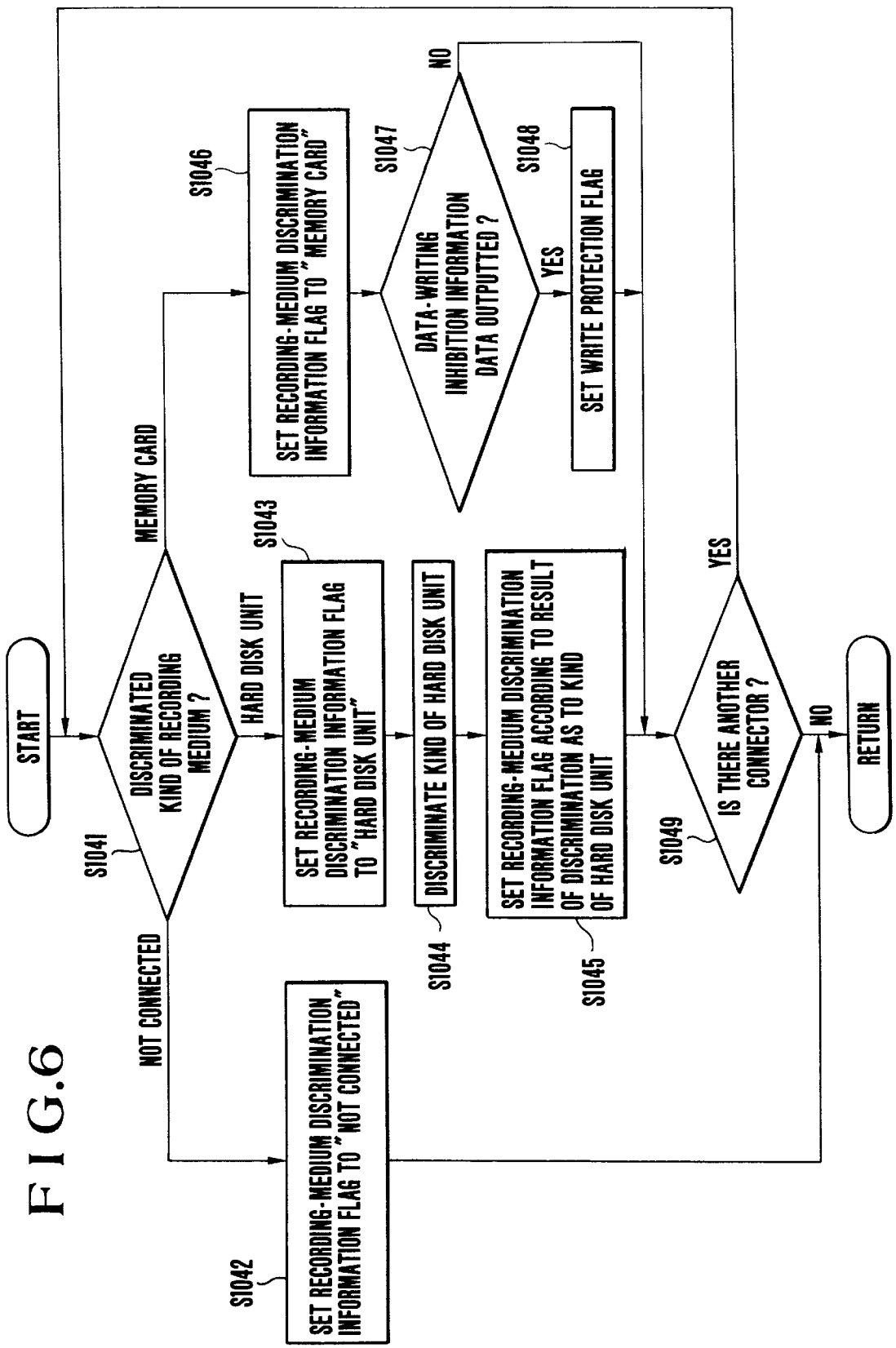
FIG. 6 is a flowchart showing in detail the operation of executing discrimination as to the kind of a recording medium, which is executed in Step S1004 or S1094 in the flowcharts shown in FIG. 5 and FIG. 10.

FIG. 6 is a flowchart showing in detail the operation of executing discrimination as to the kind of a recording medium, which is executed in Step S1004 or S1094 in the flowchart shown in FIG. 10 and FIG. 4.

The operation of executing discrimination as to the kind of a recording medium will be described in detail below with reference to the flowchart shown in FIG. 6.

Referring to FIG. 6, if the recording medium (i.e., the memory card or the hard disk unit) is connected to the connector 1030 or 1032 provided on the camera body, recording-medium discrimination information data generated by the recording-medium discrimination information data generating part of the connected recording medium is supplied to the system controlling circuit 1050 through the I/F 1026 and the connector 1030 or 1032. If no recording-medium discrimination information data is inputted, it is determined that no recording medium is connected to the connector 1030 or 1032 of the camera body (Step S1041 in FIG. 6). After a recording-medium discrimination information flag indicating that no recording medium is connected to the connector 1030 or 1032 of the camera body has been set, the operation of executing discrimination as to the kind of a recording medium is completed (Step S1042 in FIG. 6).

In Step S1041 of FIG. 6, if the aforesaid recording-medium discrimination information data is inputted through the I/F 1026 and the connector 1030 or 1032 of the camera body, it is determined that a recording medium is connected to the connector 1030 or 1032 of the camera body and it is then determined which of the memory card 1100, the hard disk unit 1180 and the hard disk unit 1250 is connected, on the basis of a content indicated by the inputted recording-medium discrimination information data. Then, the recording-medium discrimination information flag is set according to the result of the discrimination (Step S1043 or S1046 in FIG. 6).

More specifically, if the system controlling circuit 1050 determines that the memory card 1100 is connected, on the basis of the content indicated by the inputted recording-medium discrimination information data, then the system controlling circuit 1050 determines whether the information data indicative of data-writing inhibition is outputted from the write protection 1110 of the memory card 1100 and supplied to the system controlling circuit 1050 (Step S1047 in FIG. 6). If it is determined that the information data indicative of data-writing inhibition is supplied, the write protection flag is set (Step S1048 in FIG. 6). If it is determined that the hard disk unit 1180 or 1250 is connected, discrimination is made as to the kind of the hard disk unit (discrimination between the hard disk units 1180 and 1250) on the basis of the content indicated by the inputted recording-medium discrimination information data (Step S1044 in FIG. 6), and the recording-medium discrimination information flag is set according to the result of the discrimination (Step S1045 in FIG. 6).

If a series of operations for setting the recording-medium discrimination information flag operations is completed, the operation of executing discrimination as to the kind of a recording medium is completed (Step S1049 in FIG. 6).

If three or more connectors are provided on the camera body, discrimination as to the state of connection of a recording medium to each of the connectors and discrimination as to the kind of a connected recording media may be executed at the same time. If the recording medium connected to the camera body includes plural kinds of recording media such as a hard disk unit and a semiconductor memory device, the flow may return from Step S1049 to Step S1041 in FIG. 6 so that the operation of executing discrimination as to the kind of another recording medium is continued.

Figure 7:
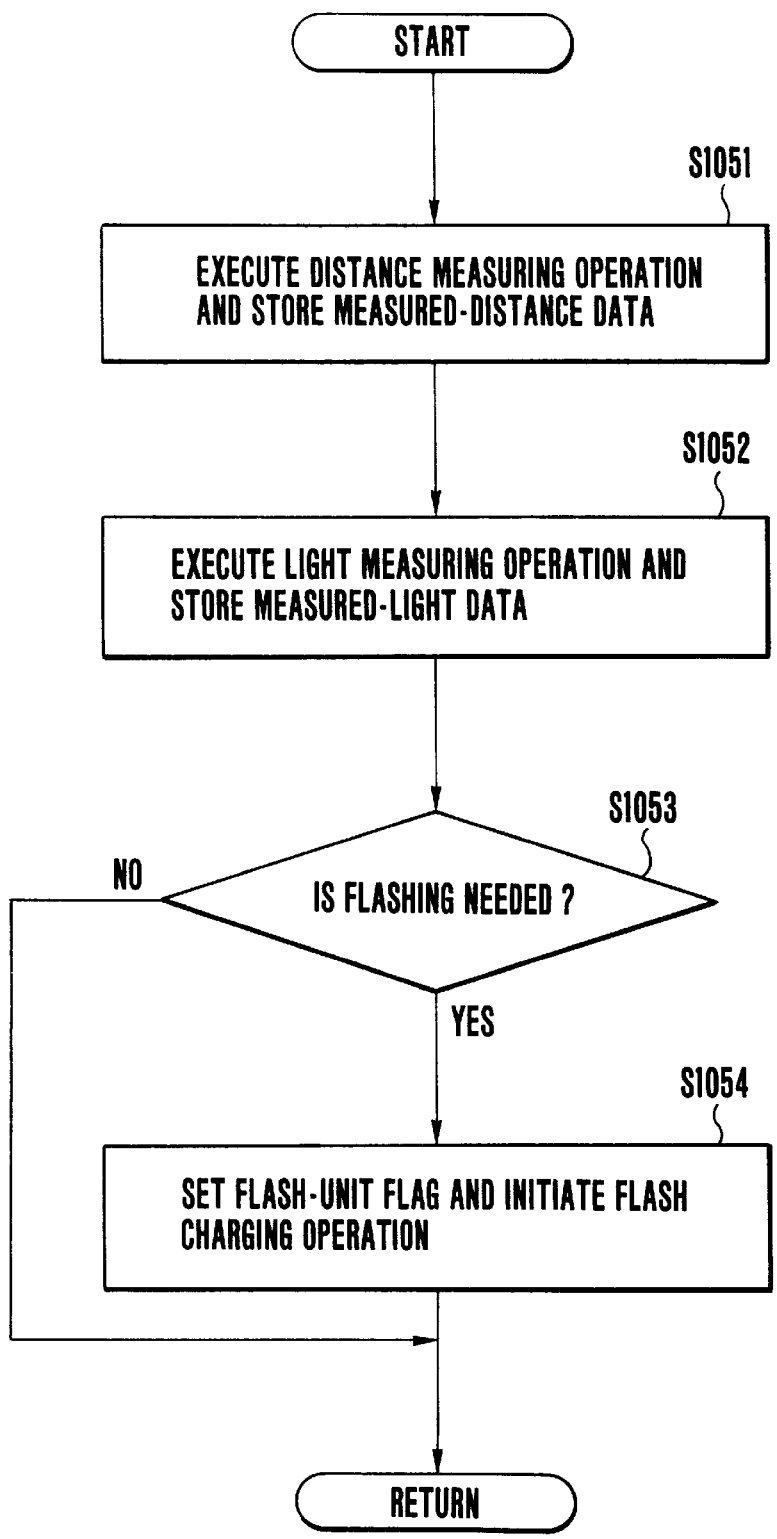
FIG. 7 is a flowchart showing in detail a distance measuring operation and a light measuring operation both of which are executed in Step S1025 of the flowchart shown in FIG. 5.

FIG. 7 is a flowchart showing in detail the distance measuring operation and the light measuring operation both of which are executed in Step S1025 shown in FIG. 5.

The operation of discrimination as to the kind of a recording medium will be described in greater detail below with reference to the flowchart shown in FIG. 7.

Referring to FIG. 7, the system controlling circuit 1050 detects the state of the distance-light measuring switch 1062.

If the distance·light measuring switch 1062 is on, the system controlling circuit 1050 causes the distance measuring circuit 1044 to measure the distance to a subject, and stores in the memory 1052 measured-distance data based on the result of the distance measurement (Step S1051 in FIG. 7). The system controlling circuit 1050 then causes the light measuring circuit 1046 to measure the luminance of the subject, and stores in the memory 1052 measured-light data based on the result of the light measurement (Step S1052 in FIG. 7).

The system controlling circuit 1050 determines whether the flash unit 1048 needs to be flashed, on the basis of the result of the light measurement executed by the light measuring circuit 1046 (Step S1053 in FIG. 7). If it is determined the flash unit 1048 needs to be flashed, the flash unit flag is set and charging of the flash unit 1048 is initiated (Step S1054 in FIG. 7).

Figure 8:
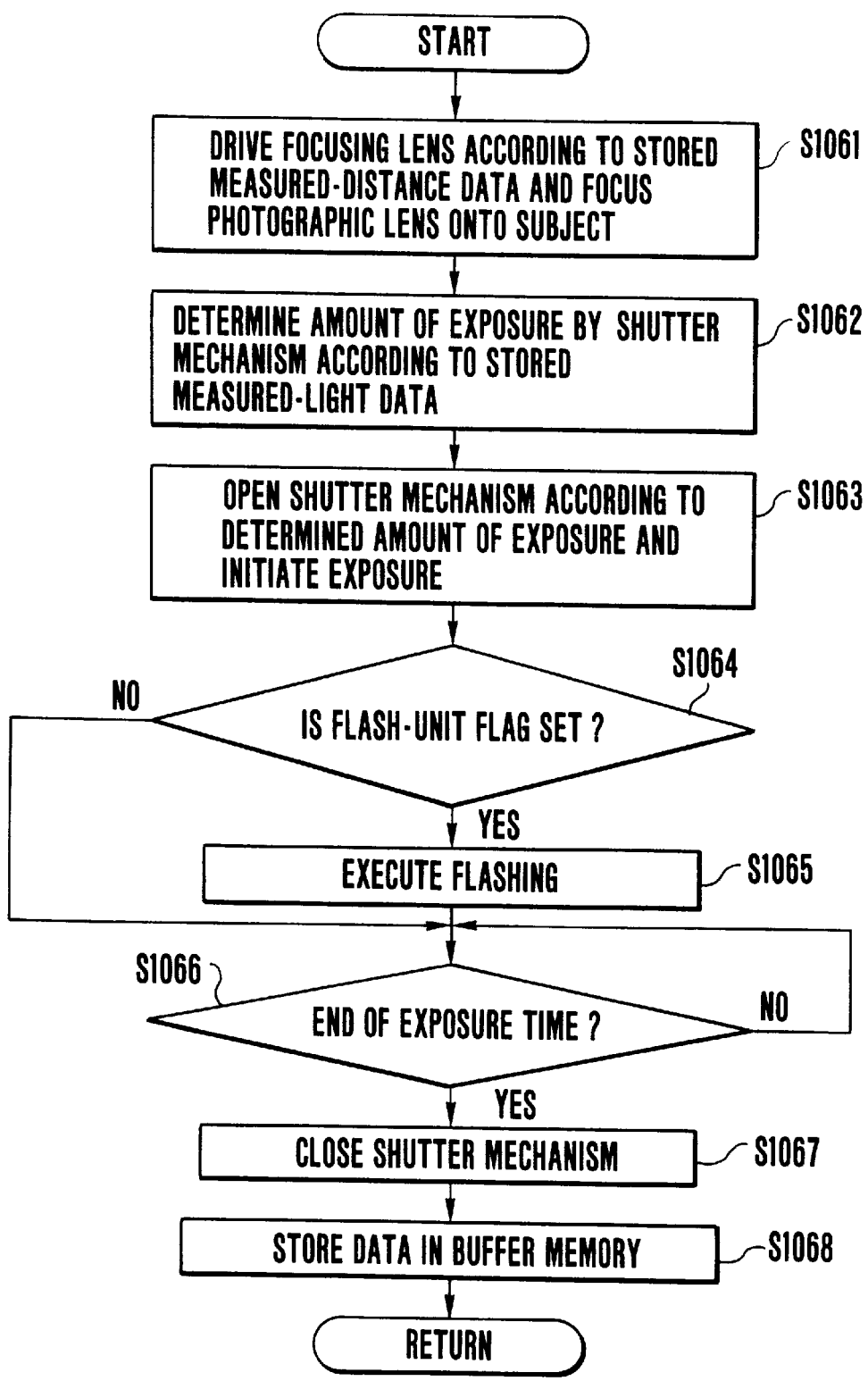
FIG. 8 is a flowchart showing in detail a photographing operation executed in Step S1027 of the flowchart shown in FIG. 5.

FIG. 8 is a flowchart showing in detail the photographing operation executed in Step S1027 of the flowchart shown in FIG. 5.

The photographing operation will be described in detail below with reference to the flowchart shown in FIG. 8.

Referring to FIG. 8, the system controlling circuit 1050 detects the state of the distance·light measuring switch 1062. If the distance·light measuring switch 1062 is on, the system controlling circuit 1050 reads the measured-distance data stored in the memory 1052, and causes the lens driving circuit 1042 to drive the focusing lens of the photographic lens unit 1010 on the basis of the read measured-distance data, thereby focusing the photographic lens unit 1010 onto the subject (Step S1061 in FIG. 8). In addition, the system controlling circuit 1050 reads the measured-light data stored in the memory 1052 and, on the basis of the read measured-light data, determines the amount of exposure of the subject by the shutter mechanism 1012 so that the subject optical image formed on the imaging surface of the image sensor 1014 achieves an optimum amount of exposure. Then, the system controlling circuit 1050 causes the shutter driving circuit 1040 to drive the shutter mechanism 1012 to keep the shutter mechanism 1012 open during a time interval corresponding to the determined amount of exposure, thereby exposing the imaging surface of the image sensor 1014 to the subject optical image (Step S1062 and S1063 in FIG. 8).

Then, the system controlling circuit 1050 detects whether the flash unit flag to be set according to the result of the light measurement executed by the light measuring circuit 1046 (Step S1064 in FIG. 8). If the flash unit is set, the flash unit 1048 is flashed (Step S1065 in FIG. 8).

If it is determined (step S1066 in FIG. 8) that the exposure time has elapsed which is set according to the determined amount of exposure and during which the imaging surface of the image sensor 1014 is exposed to the subject optical image by the shutter mechanism 1012, the system controlling circuit 1050 completes the operation of exposing the imaging surface of the image sensor 1014 to the subject optical image by causing the shutter driving circuit 1042 to drive and close the shutter mechanism 1012 (Step S1067 in FIG. 8). Then, the charge signal stored in the image sensor 1014 is outputted to the process circuit 1016, where the charge signal is subjected to known camera signal processing. The output from the process circuit 1016 is digitized by the A/D converter 1018. If the data outputted from the A/D converter 1018 is to be compressed, the data is supplied to the buffer memory 1024 through the compression circuit 1020 by means of the SW 1022. If the compression is not needed, the data is supplied from the SW 1022 to the buffer memory 1024. Thus, the buffer memory 1024 temporarily stores data corresponding to an image for one photographed picture (Step S1068 in FIG. 8).

Figure 11:
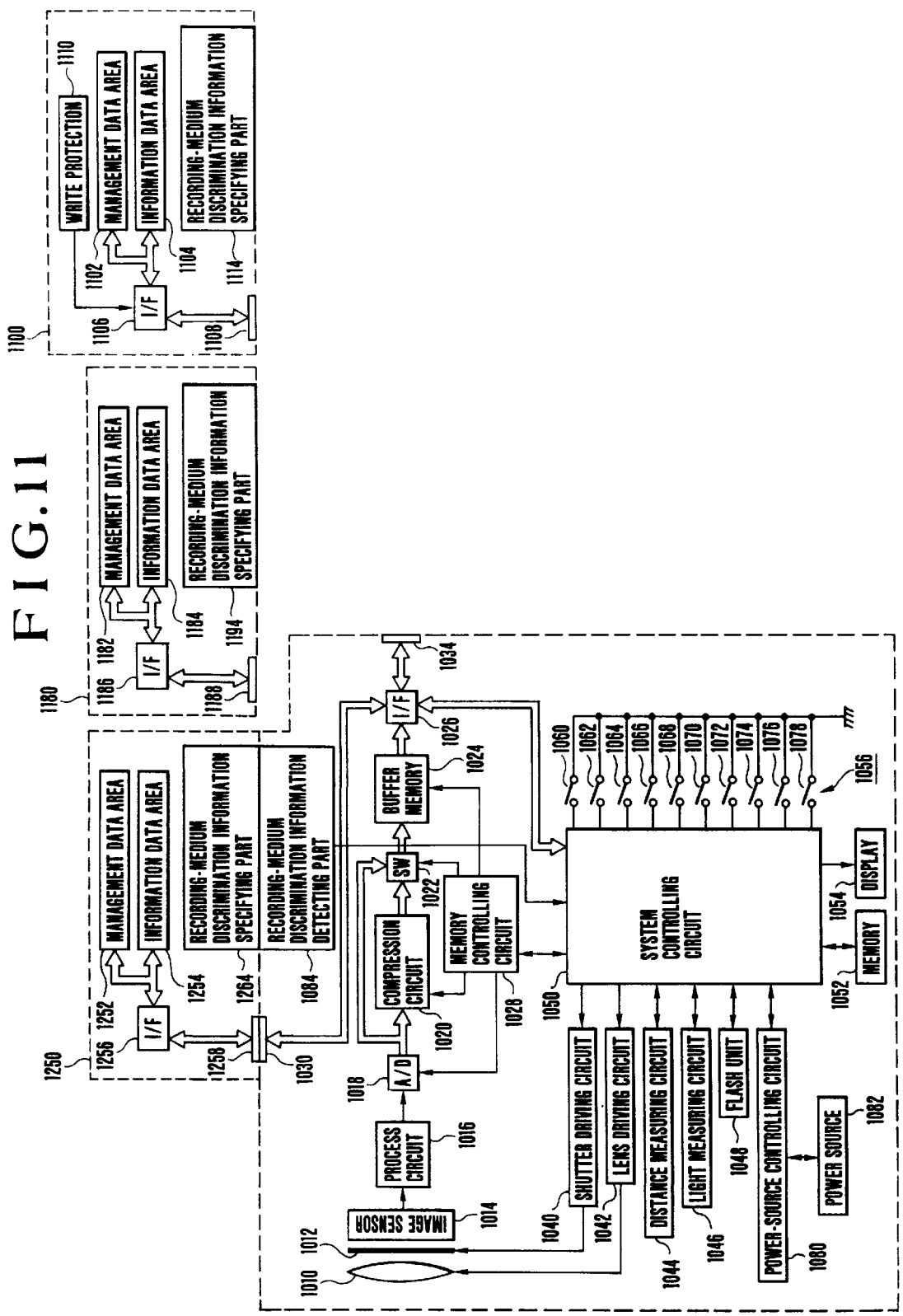
FIG. 11 is a schematic block diagram schematically showing an electronic still video camera to which the present invention is applied as a fourth embodiment thereof.
Figure 12:
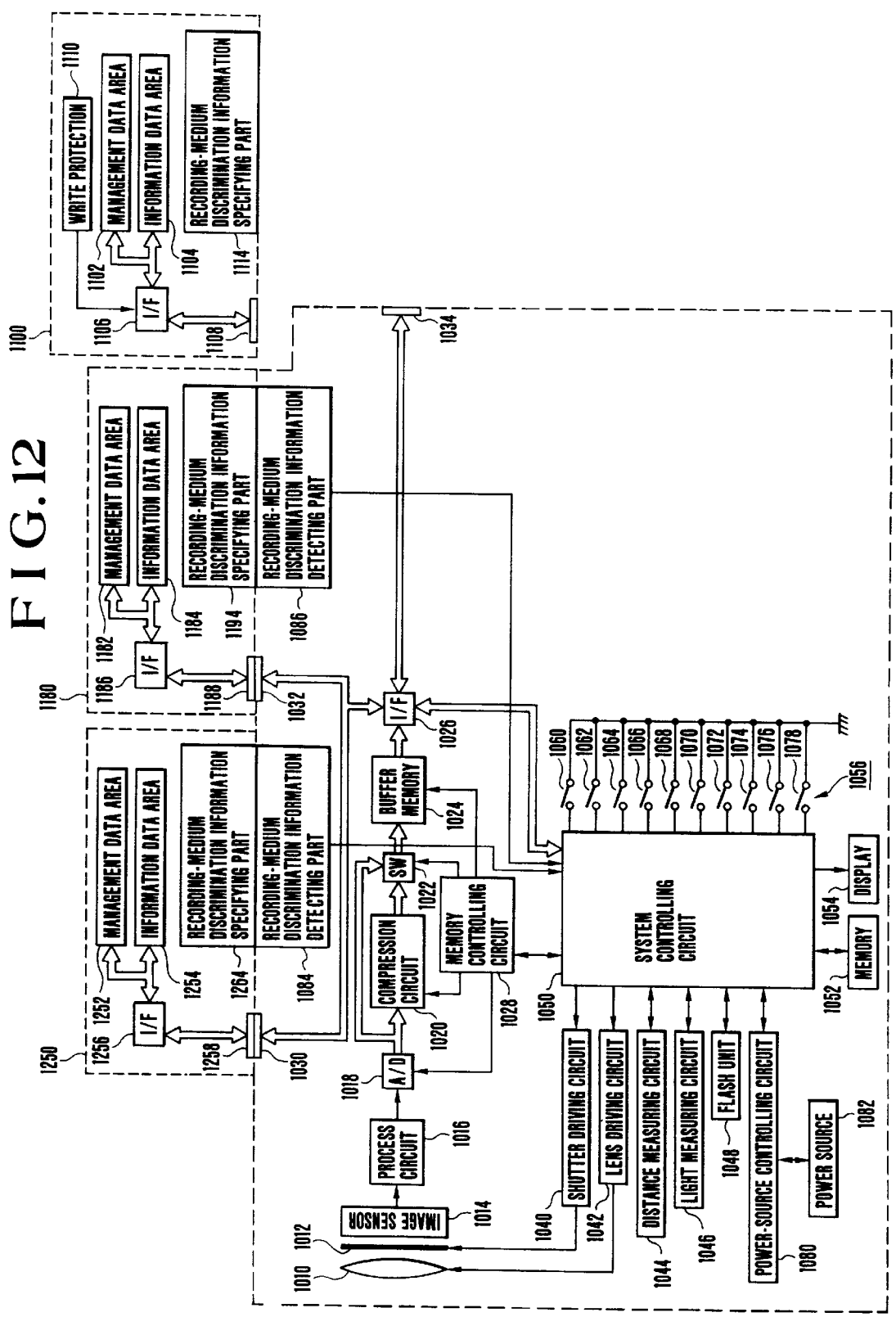
FIG. 12 is a schematic block diagram schematically showing an electronic still video camera to which the present invention is applied as a fifth embodiment of the present invention.

FIGS. 11 and 12 are schematic block diagrams respectively showing electronic still video cameras to which the present invention is applied as fourth and fifth embodiments thereof.

In FIGS. 11 and 12, reference numerals 1114, 1194 and 1264 respectively denote recording-medium discrimination information specifying parts, and reference numerals 1084 and 1086 respectively denote recording-medium discrimination information detecting parts. In these figures, the same reference numerals are used to denote constituent elements similar to those shown in FIGS. 3 and 9, and detailed description thereof is omitted.

In the respective arrangements shown in FIGS. 11 and 12, the recording-medium discrimination information specifying part 1114 serves to specify information corresponding to the kind, characteristics and the like of the memory card 1100, and the contents of information specified by the recording-medium discrimination information specifying part 1114 can be detected by the recording-medium discrimination information detecting parts 1084 and 1086. When the memory card 1100 is connected to the connector 1030 or 1032 provided on the camera body, the recording-medium discrimination information specifying part 1114 of the connected memory card 1100 is associated with the recording-medium discrimination information detecting part 1084 or 1086, and the system controlling circuit 1050 can identify the memory card 1100 connected to the connector 1030 or 1032, according to the contents of the information detected by the recording-medium discrimination information detecting part 1084 or 1086.

Similarly, the recording-medium discrimination information specifying part 1194 serves to specify information corresponding to the kind, characteristics and the like of the hard disk unit 1180, and the recording-medium discrimination information specifying part 1264 serves to specify information corresponding to the kind, characteristics and the like of the hard disk unit 1250. The contents of information specified by the recording-medium discrimination information specifying part 1194 or 1264 can be detected by the recording-medium discrimination information detecting part 1084 or 1086. When the hard disk unit 1180 or 1250 is connected to the connector 1030 or 1032 provided on the camera body, the recording-medium discrimination information specifying part 1194 or 1264 of the connected hard disk unit 1180 or 1250 is associated with the recording-medium discrimination information detecting part 1084 or 1086, and the system controlling circuit 1050 can determine whether the hard disk unit 1180 or 1250 is connected to the connector 1030 or 1032, according to the contents of the information detected by the recording-medium discrimination information detecting part 1084 or 1086.

Various arrangements can be adopted to achieve the above-described information specifying function of each of the recording-medium discrimination information specifying parts 1114, 1194 and 1268. For example, the contents of their information may be mechanically specified by selecting the number or shape of information-specifying pins, the shape of an information-specifying opening, or the shape of an information-specifying projection according to information such as the kind and characteristics of each recording medium. Otherwise, information such as the kind and characteristics of each recording medium may be converted into a code, and the contents of the information may be electrically or optically specified by producing an electrical or optical pulse from the code. Each of the recording-medium discrimination information detecting parts 1084 and 1086 may be similarly arranged to mechanically, electrically or optically detect the contents of the information mechanically, electrically or optically specified by the recording-medium discrimination information specifying part 1114, 1194 or 1268.

Figure 13:
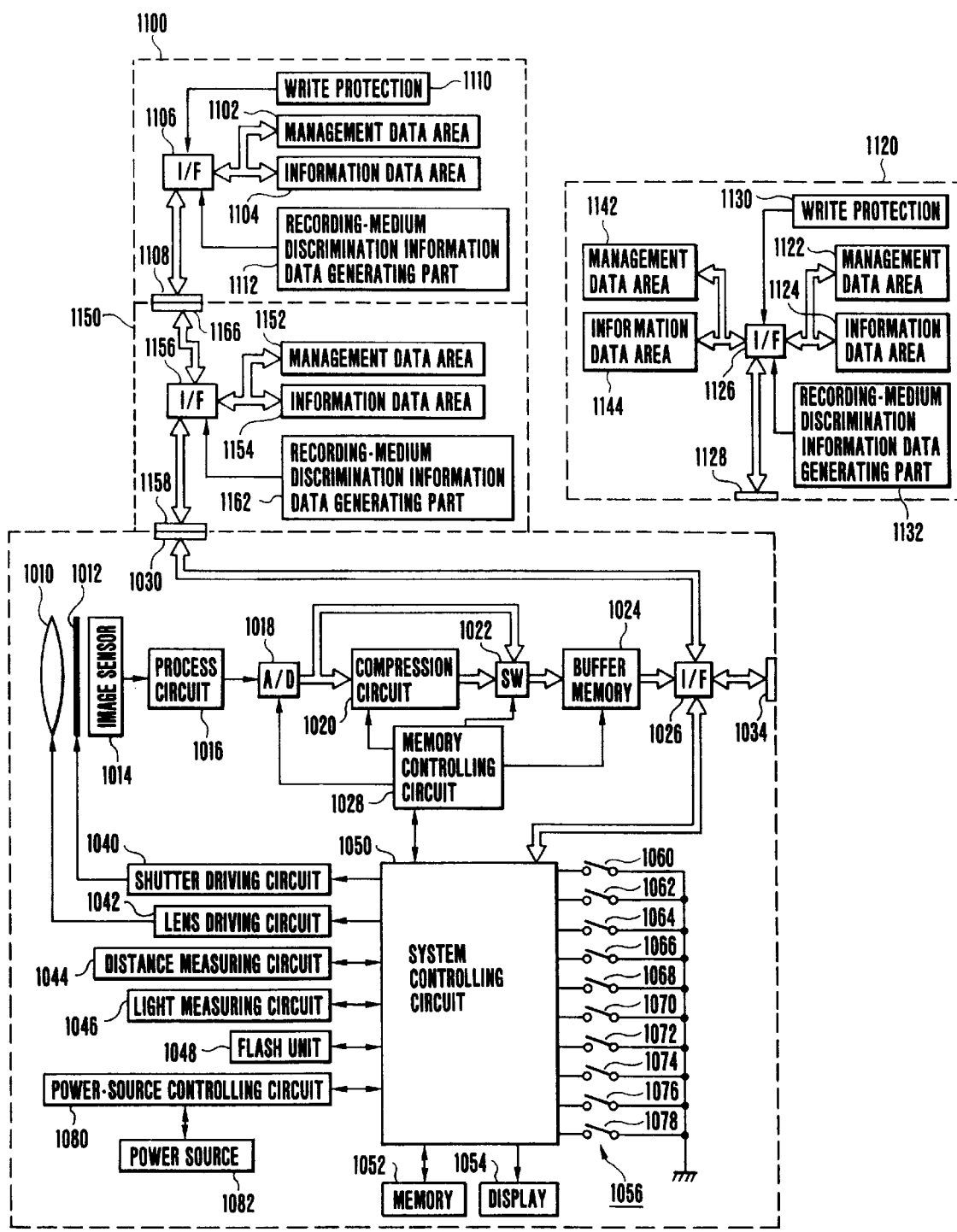
FIG. 13 is a schematic block diagram schematically showing an electronic still video camera to which the present invention is applied as a sixth embodiment of the present invention.
Figure 14:
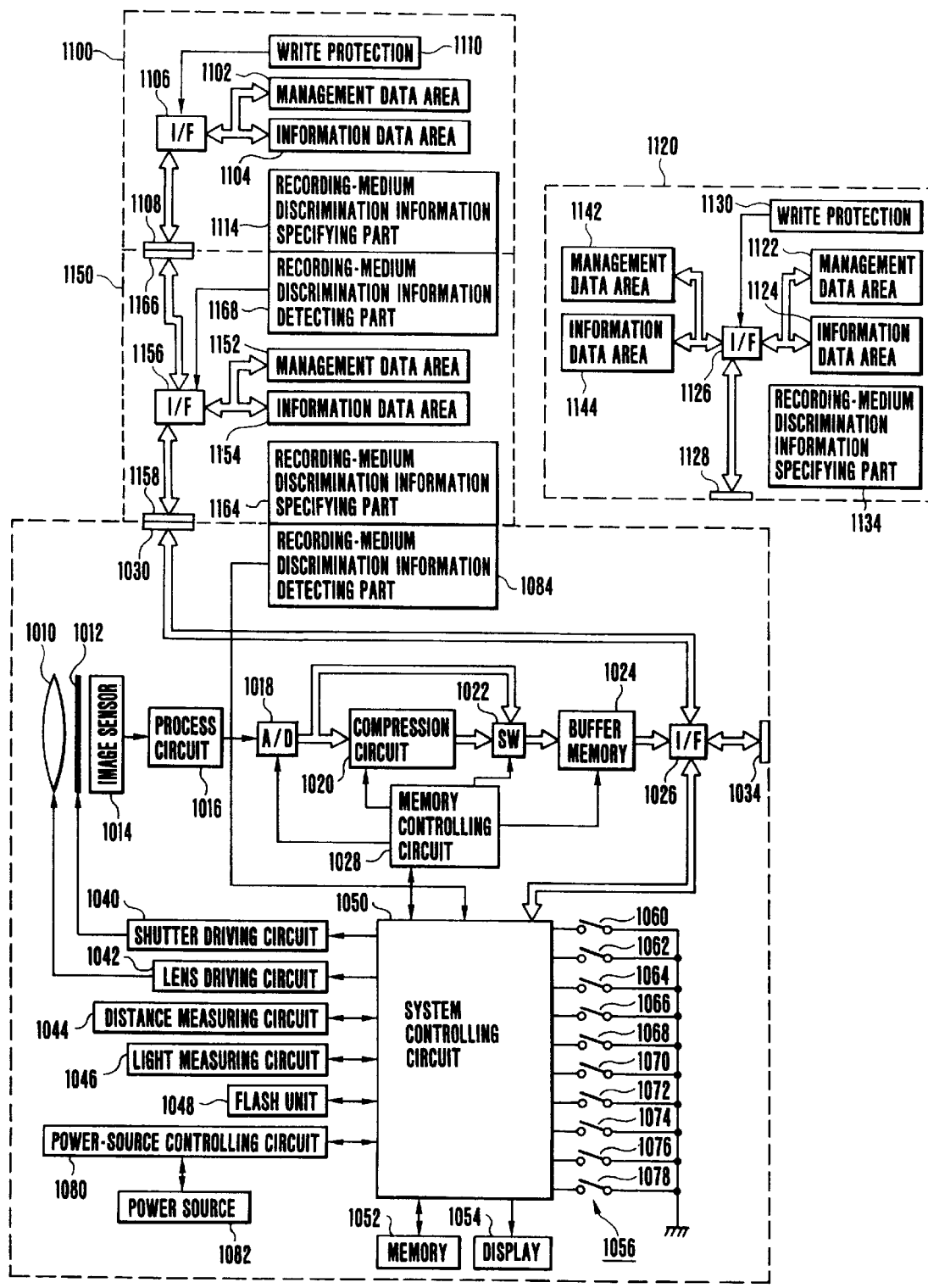
FIG. 14 is a schematic block diagram schematically showing an electronic still video camera to which the present invention is applied as a seventh embodiment of the present invention.

FIGS. 13 and 14 are schematic block diagrams schematically showing electronic still video cameras to which the present invention is applied as sixth and seventh embodiments thereof.

Referring to FIGS. 13 and 14, a composite recording medium 1120 includes a memory card part and a hard disk unit part which are integrally arranged. The memory card part has a management data area 1122, an information data area 1124 and a write protection 1130, and the hard disk unit part has a management date area 1142 and an information data area 1144. The composite recording medium 1120 is arranged in such a manner that data is inputted to, or outputted from, each of the memory card part and the hard disk unit part through a common circuit formed by an I/F 1126 and a connector 1128. Each of the electronic still video cameras shown in FIGS. 13 and 14 is arranged so that if the composite recording medium 1120 is connected to the connector 1030 of the camera body, data can be recorded by using either or both of the memory card part and the hard disk part which are provided in the connected composite recording medium 1120.

As shown in FIG. 13, the composite recording medium 1120 has a recording-medium discrimination information data generating part 1132. Recording-medium discrimination information data indicative of the kind, characteristics and the like of the composite recording medium 1120 is generated from the recording-medium discrimination information data generating part 1132 and is outputted to the outside through the I/F 1126 and the connector 1128. The system controlling circuit 1050 detects from the recording-medium discrimination information data that the composite recording medium 1120 is connected to the connector 1030.

As shown in FIG. 14, the composite recording medium 1120 has a recording-medium discrimination information specifying part 1134. The recording-medium discrimination information specifying part 1134 serves to specify information corresponding to the kind, characteristics and the like of the composite recording medium 1120, and the contents of information specified by the recording-medium discrimination information specifying part 1134 can be detected by the recording-medium discrimination information detecting part 1084. When the composite recording medium 1120 is connected to the connector 1030 provided on the camera body, the recording-medium discrimination information specifying part 1134 of the connected composite recording medium 1120 is associated with the recording-medium discrimination information detecting part 1084 provided on the camera body, and the system controlling circuit 1050 can detect that the composite recording medium 1120 is connected to the connector 1030, according to the contents of the information detected by the recording-medium discrimination information detecting part 1084.

As shown in each of FIGS. 13 and 14, a hard disk unit 1150 has a connector 1166 to which the memory card 1100 can be connected, and is arranged in such a manner that data is inputted to, or outputted from, the memory card 1100 connected to the connector 1166, through an I/F 1156 and a connector 1158. Each of the electronic still video cameras shown in FIGS. 13 and 14 is arranged so that if the hard disk unit 1150 is connected to the connector 1030 of the camera body and the memory card 1100 is connected to the connector 1166 of the hard disk unit 1150, data can be recorded by using either or both of the connected hard disk unit 1150 and the memory card 1100.

As shown in FIG. 13, the hard disk unit 1150 has a recording-medium discrimination information data generating part 1162. Recording-medium discrimination information data indicative of the kind, characteristics and the like of the hard disk unit 1150 is generated from the recording-medium discrimination information data generating part 1162 and is outputted to the outside through the I/F 1156 and the connector 1158. The system controlling circuit 1050 detects from the recording-medium discrimination information data that the hard disk unit 1150 is connected to the connector 1030. If the memory card 1100 is connected to the connector 1166 of the hard disk unit 1150, recording-medium discrimination information data indicative of the kind, characteristics and the like of the connected memory card 1100, which is generated from the recording-medium discrimination information data generating part 1112 of the memory card 1100, is supplied to the system controlling circuit 1050 through the I/F 1106 and the connector 1108 of the memory card 1100 and the connector 1166, the I/F 1156 and the connector 1158 of the hard disk unit 1150 and the connector 1030 and the I/F 1026 of the camera body. The system controlling circuit 1050 detects from the recording-medium discrimination information data that the memory card 1100 is connected to the connector 1166 of the hard disk unit 1150.

As shown in FIG. 14, the hard disk unit 1150 has a recording-medium discrimination information specifying part 1164. The recording-medium discrimination information specifying part 1164 serves to specify information corresponding to the kind, characteristics and the like of the hard disk unit 1150, and the contents of information specified by the recording-medium discrimination information specifying part 1164 can be detected by the recording-medium discrimination information detecting part 1084. When the hard disk unit 1150 is connected to the connector 1030 provided on the camera body, the recording-medium discrimination information specifying part 1164 of the connected hard disk unit 1150 is associated with the recording-medium discrimination information detecting part 1084 provided on the camera body, and the system controlling circuit 1050 can detect that the hard disk unit 1150 is connected to the connector 1030, according to the contents of the information detected by the recording-medium discrimination information detecting part 1084.

The hard disk unit 1150 also has a recording-medium discrimination information detecting part 1168. If the memory card 1100 is connected to the connector 1166 of the hard disk unit 1150, the recording-medium discrimination information detecting part 1168 can detect the contents of information corresponding to the kind, characteristics and the like of the memory card 1100, specified by the recording-medium discrimination information specifying part 1114 of the memory card 1100. When the memory card 1100 is connected to the connector 1166 of the hard disk unit 1150, the recording-medium discrimination information specifying part 1114 of the connected memory card 1100 is associated with the recording-medium discrimination information detecting part 1168 of the hard disk unit 1150. The information detected by the recording-medium discrimination information detecting part 1168 is supplied to the system controlling circuit 1050 through the I/F 1156 and the recording-medium discrimination information specifying part 1164 of the hard disk unit 1150 and the recording-medium discrimination information detecting part 1084 of the camera body. The system controlling circuit 1050 can detect that the memory card 1100 is connected to the connector 1166 of the hard disk unit 1150, according to the contents of the information detected by the recording-medium discrimination information detecting part 1084.

Another arrangement may be applied to each of the electronic still video cameras shown in FIGS. 13 and 14 so that the system controlling circuit 1050 can detect that the memory card 1100 is connected to the connector 1166 of the hard disk unit 1150. For example, the information specified by the recording-medium discrimination information specifying part 1114 of the memory card 1100 may be detected by the recording-medium discrimination information detecting part 1168 of the hard disk unit 1150 and the detected information may be supplied to the system controlling circuit 1050 through the I/F 1156 and the connector 1158 of the hard disk unit 1150 and the connector 1030 and the I/F 1026 of the camera body. Otherwise, the information generated from the recording-medium discrimination information data generating part 1112 of the memory card 1100 may be supplied to the system controlling circuit 1050 through the I/F 1106 and the connector 1108 of the memory card 1100 and the connector 1166, the I/F 1156 and the recording-medium discrimination information specifying part 1164 of the hard disk unit 1150, and the recording-medium discrimination information detecting part 1084 of the camera body.

In the above description of each of the second to seventh embodiments, reference has been made to the electronic still video camera in which the memory card or the hard disk unit is formed as a recording medium separate from the camera body and can be arbitrarily connected to the camera body. However, it is apparent that either or both of the memory card and the hard disk unit may be fixed to or formed integrally with the camera body. The present invention is also applied to this type of arrangement and can achieve advantages similar to the above-described ones.

In the above description of each of the second to seventh embodiments, reference has been made to the electronic still video camera which is arranged to form a subject image by image sensing, convert a still image signal for one picture corresponding to the formed subject image into a digital signal and record the digital signal by using a recording medium such as a memory card or a hard disk unit. However, the present invention is also applicable to an apparatus which is arranged to pick up a sound of a subject by means of a microphone (not shown), produce a sound signal by converting the sound into an electrical signal, convert the sound signal into a digital signal and record the digital signal by using a recording medium such as a memory card or a hard disk unit. In this type of apparatus as well, it is possible to achieve advantages similar to the above-described ones.

As described above, in accordance with the above-described second to seventh embodiments, in the case of an electronic still video camera to which different kinds of recording media can be selectively connected one at a time, detection is made as to the start-up time of a connected recording medium, which is needed to initiate recording an information signal by using the connected recording medium, and as to the amount of power consumption required for the start-up operation of the connected recording medium, and the start-up operation of the connected recording medium and the amount of power consumption required for the start-up operation are optimumly controlled on the basis of the result of the detection to record the information signal by using the connected recording medium. In the case of an electronic still video camera to which different kinds of recording media can be connected at the same time, detection is made as to the start-up time of a recording medium selected from among connected recording media, which start-up time is needed to initiate recording an information signal by using the selected recording medium, and as to the amount of power consumption required for the start-up operation of the selected recording medium, and the start-up operation of the selected recording medium and the amount of power consumption required for the start-up operation are optimumly controlled on the basis of the result of the detection to record the information signal by using the selected recording medium. Accordingly, even in the case of either electronic still video camera, it is possible to record an information signal in an optimum state while reducing an excess power consumption.

As is apparent from the above description, in accordance with any of the above-described second to seventh embodiments, it is possible to solve the conventional problems and to provide an information signal recording apparatus capable of reducing an excess power consumption by optimumly controlling the start-up time of a recording medium which is selected from among plural kinds of recording media for the purpose of recording an information signal, which start-up time is needed to initiate recording the information signal by using the selected recording medium, and the supply of the electric power required for the start-up operation, in accordance with the kind of the selected recording medium.

A transmission system according to an eighth embodiment of the present invention will be described in detail below.

Figure 15:
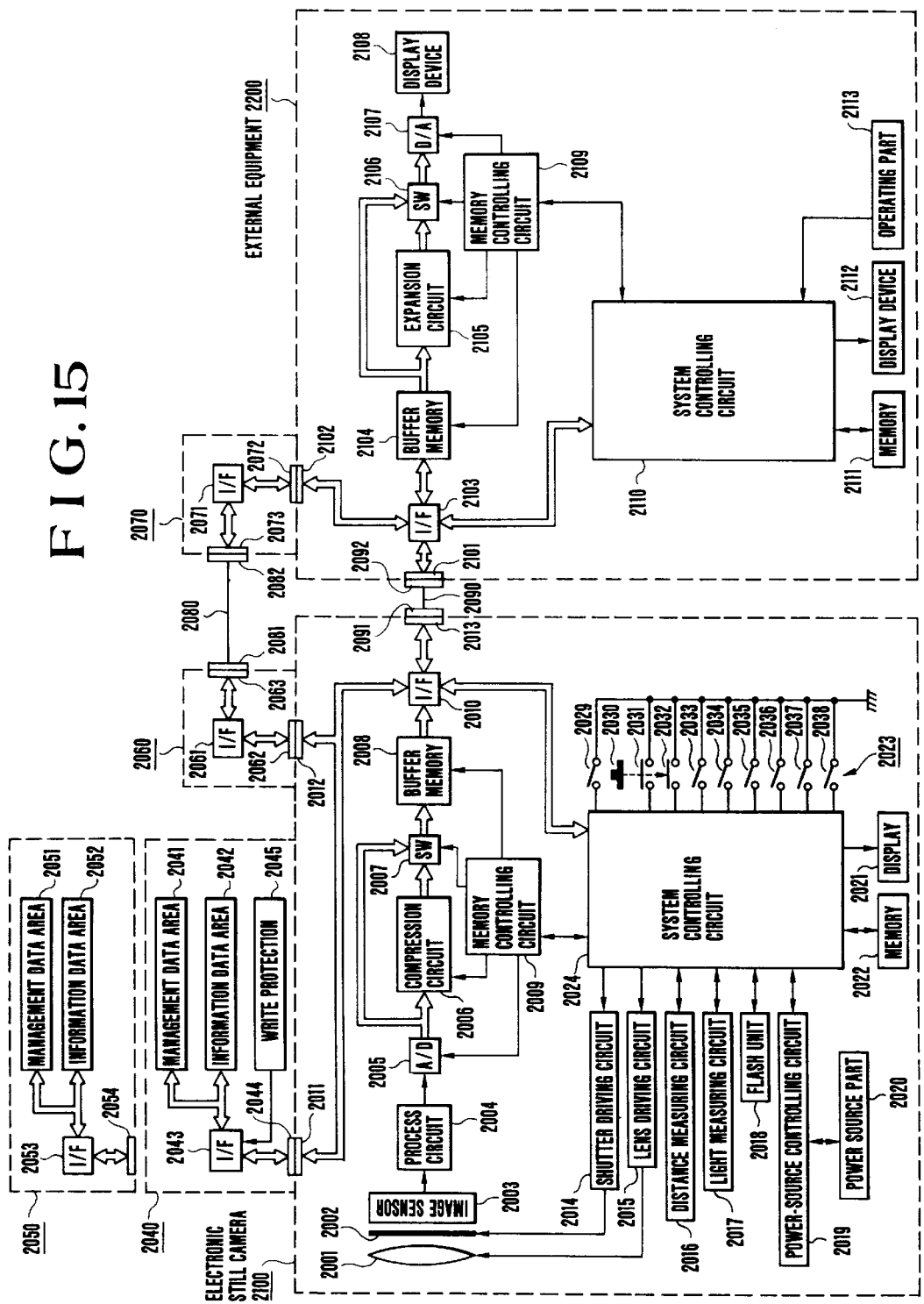
FIG. 15 is a schematic block diagram showing the transmission system according to the eighth embodiment of the present invention.

FIG. 15 is a schematic block diagram showing the transmission system according to the eighth embodiment of the present invention.

In FIG. 15, a block 2100 represents an electronic still camera provided with a transmission function.

The arrangement of the electronic still camera 2100 will be described below.

The electronic still camera shown in FIG. 15 includes a photographic lens unit 2001, a shutter 2002 provided with a diaphragm function, an image sensor 2003 for converting an optical image into an electrical signal by means of a CCD or the like, a process circuit 2004 for performing known camera-signal processing such as gamma correction, an A/D converter 2005 for converting an analog output from the process circuit 2004 into a digital signal, an image compression circuit 2006 for performing compression of image data by means of adaptive discrete cosine transform (ADCT) or the like, and a selecting switch 2007 for performing switching between the transmission of image data compressed by the image compression circuit 2006 and that of image data (noncompressed) which has bypassed the image compression circuit 2006.

The shown electronic still camera also includes a buffer memory 2008 for temporarily storing image data (video signal), and the stored video signal can be read from the buffer memory 2008 at a desired speed under control of a memory controlling circuit 2009 which will be described later.

The memory controlling circuit 2009 is provided for controlling the A/D converter 2005, the image compression circuit 2006 and the buffer memory 2008. During compression, the compressed image data outputted from the image compression circuit 2006 is written into the buffer memory 2008, while, during noncompression, the image data outputted from the A/D converter 2005 is written into the same, under control of the memory controlling circuit 2009.

The shown electronic still camera also includes an interface (I/F) 2010 for providing connection between the internal circuit of the electronic still camera and a memory card 2040, a hard disk unit 2050 or a transmission modulator-demodulator (modem) 2060. The interface 2010 enables data to be transmitted not through the modem 2060 but through a connector 2013.

The shown electronic still video system also includes connectors 2011 and 2012 for providing connection between the camera body and the memory card 2040, the hard disk unit 2050 or the modem 2060, and the connectors 2011 and 2012 are also used for data transmission.

The shown electronic still video system also includes a connector 2013 dedicated to data transmission.

The arrangement of the memory card 2040 will be described below.

The memory card 2040 has a recording area formed by a management data area 2041 and an information data area 2042, and information to be stored in the memory card 2040 is written from the outside through an interface 2043 and a connector 2044 of the memory card 2040. Information in a write protection (write inhibition) 2045 can also be read out through the interface 2043 and the connector 2044. The interface 2043 includes constituent elements, such as a control circuit such as a CPU or an MPU, a nonvolatile memory such as a ROM or an EEPROM, and a RAM, and executes control of the memory card 2040 on the basis of a predetermined program.

The arrangement of the hard disk unit 2050 will be described below.

The hard disk unit 2050 has a memory area formed by a management data area 2051 and an information data area 2052, and information to be stored in the hard disk unit 2050 is written from the outside through an interface 2053 and a connector 2054. The interface 2053 includes constituent elements, such as a control circuit such as a CPU or an MPU, a nonvolatile memory such as a ROM or an EEPROM, and a RAM, and executes control of the hard disk unit 2050 on the basis of a predetermined program.

The arrangement of the electronic still camera 2100 will further be described.

The shown electronic still camera also includes a shutter driving circuit 2014 for driving the shutter 2002, a lens driving circuit 2015 for driving a focusing lens provided in the photographic lens unit 2001, a distance measuring circuit 2016 for measuring the distance to a subject, a light measuring circuit 2017 for measuring the luminance of the subject, a flash unit 2018, a power-source controlling circuit 2019 for detecting the state of a power source part 2020 and controlling the power source part 2020, and the power source part 2020. The power source part 2020 is made up of elements such as a battery, a DC-DC converter and a switch for selecting a block to be energized, and is controlled by the power-source controlling circuit 2019.

The power-source controlling circuit 2019 detects the presence or absence of an attached battery, the kind of the attached battery and the amount of power remaining in the attached battery, and controls the power source part 2020 in accordance with the result of the detection and an instruction supplied from the system controlling circuit 2024.

The electronic still camera 2100 also includes a display device 2021 for displaying the state of operation (the number of exposures and the like) of the electronic still camera 2100 and a controlling memory 2022 for storing constants, variables and the like for photographing operation of the system controlling circuit 2024.

The electronic still camera 2100 includes a switch group 2023 which is operated to input various operational instructions into the system controlling circuit 2024. The switch group 2023 includes, for example, a main switch 2029, a distance·light measuring switch 2031 arranged to be closed by a first stroke of a release button 2030 to specify execution of a distance measurement by the distance measuring circuit 2016 and execution of a light measurement by the light measuring circuit 2017, a recording switch 2032 arranged to be closed by a second stroke of the release button 2030 to specify execution of recording of a photographed image by using the memory card 2040 or the hard disk unit 2050, a mode switch 2033 for selecting a desired photographic mode from among a single-shooting (S) mode for executing one or one set of photographic cycles, a continuous-shooting (C) mode for continuously executing a plurality of or plural sets of photographic cycles, and a self-timer photography mode, and an image mode switch 2034 for selecting a desired image recording format such as the number of images to be recorded, frame recording/field recording, an aspect ratio, the arrangement of pixels, a compression method and a compression ratio (although the switch 2034 is shown as a single switch in FIG. 15, it is actually made up of a plurality of switch elements). The switch group 31 also includes an erase mode switch 2035 for selecting an erase mode, an erase switch 2036 for specifying execution of erasure, a transmission mode switch 2037 for selecting a transmission mode, a transmission switch 2038 for specifying execution of transmission, and other associated elements.

The system controlling circuit 2024 provides control over the entire electronic still camera in accordance with an instruction supplied from the switch group 2023, detection information obtained from the detection of the kind of a recording medium removably attached to the camera body and the detection of the state (remaining storing capacity) of the recording medium, and detection information provided by various other detecting devices provided in the camera body. For example, the system controlling circuit 2024 causes the lens driving circuit 2015 to drive the focusing lens of the photographic lens unit 2001 on the basis of a measurement result provided by the distance measuring circuit 2016, thereby controlling the photographic lens unit 2001 so that it can move to an in-focus position. In addition, the system controlling circuit 2024 causes the shutter driving circuit 2014 to determine the open time of the shutter 2002 so that an optimum amount of exposure can be obtained, on the basis of a measurement result provided by the light measuring circuit 2017.

Transmission modems 2060 and 2070 will be described below.

The transmission modem 2060 has an interface 2061 so that while predetermined data conversion is being executed, data is transmitted between the transmission modem 2060 and the electronic still camera 2100 through a connector 2062 or between the transmission modem 2060 and a transmission modem 2070 connected to external equipment 2200 (to be described later) through a connector 2063.

Similarly, the transmission modem 2070 has an interface 2071 and connectors 2072 and 2073 so that while predetermined data conversion is being executed, data is transmitted between the transmission modem 2070 and the external equipment 2200 through the connector 2072 or between the transmission modems 2070 and 2060 through the connector 2073.

A line 2080 represents a transmission modem cable, and the transmission modem cable 2080 has connectors 2081 and 2082 for providing connection with the transmission modems 2060 and 2070, respectively.

The arrangement of the external equipment 2200 which is capable of transmitting and receiving data to and from the electronic still camera 2100 will be described below.

The external equipment 2200 includes a transmission connector 2101 to which a transmission cable 2090 is connected and a connector 2102 to which the transmission modem 2070 is connected, and the memory card 2040 or the hard disk unit 2050 is also connectable to the connector 2102.

The external equipment 2200 also includes an interface 2103 for permitting data transmission through the connector 2101 or 2102.

The external equipment 2200 also includes a buffer memory 2104 for temporarily storing image data transmitted from the electronic still camera 2100, a data expansion circuit 2105 for expanding compressed image data, and a selecting switch 2106 for performing switching between the transmission of image data expanded by the image expansion circuit 2105 and that of image data (nonexpanded) which has bypassed the image expansion circuit 2105.

The external equipment 2200 also includes a D/A converter 2107 and a display device 2108 for visually displaying transmitted image data or image data recorded by using a connected recording medium.

A memory controlling circuit 2109 is provided for controlling the buffer memory 2104, the data expansion circuit 2105, the selecting switch 2106 and the D/A converter 2107. During expansion, the expanded image signal outputted from the data expansion circuit 2105 is D/A converted and visually displayed on the display device 2108 under control of the memory controlling circuit 2109. If no expansion is needed, the image data outputted from the buffer memory 2104 is similarly D/A converted and visually displayed on the display device 2108 under control of the memory controlling circuit 2109.

The external equipment 2200 also includes a system controlling circuit 2110 for controlling the entire external equipment 2200, a memory 2111 in which various data are stored, such as the constants and variables required for the controlling operation of the system controlling circuit 2110, and a display device 2112, such as a liquid-crystal display, for displaying the operational state of the external equipment 2200, and an operating part 2113 for inputting various operational instructions to the system controlling circuit 2110.

Transmission of data between the external equipment 2200 and the electronic still camera 2100 is carried out not only by means of the above-described transmission modems 2060 and 2070, but also by means of the transmission cable 2090 connected to the connector 2101. The transmission cable 2090 has connectors 2091 and 2092 which are respectively provided for connection to the connector 2013 of the electronic still camera 2100 and to the connector 2101 of the external equipment 2200.

The operational control of the transmission system having the above-described arrangement will be described in detail below with reference to FIGS. 15 through 18.

Figure 16:
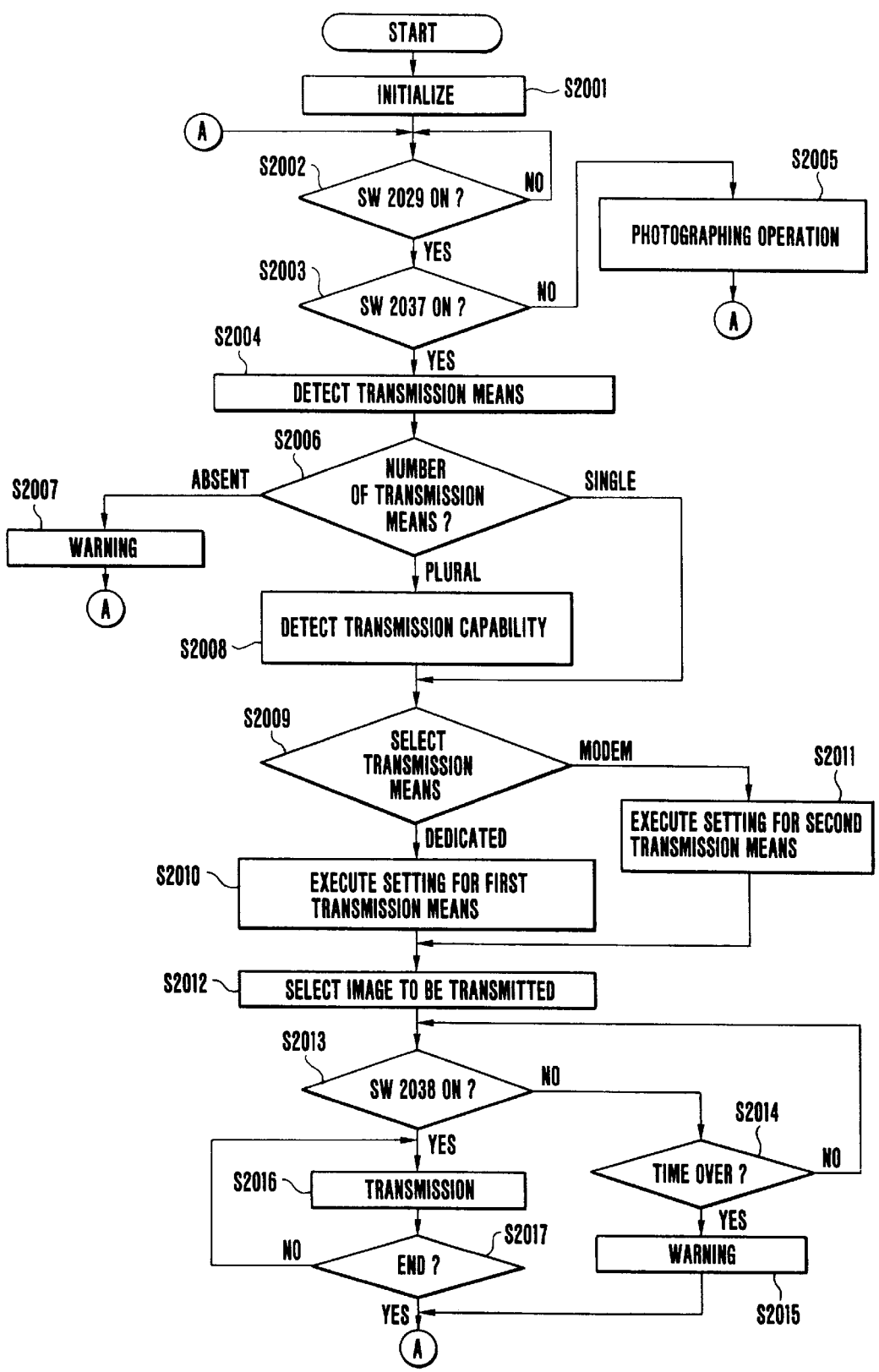
FIG. 16 is a flowchart showing the main routine of the embodiment shown in FIG. 15.

FIG. 16 is a flowchart showing the main routine of the transmission system according to the eighth embodiment.

When the power source part 2020 is turned on, the system controlling circuit 2024 initializes various flags and control variables (Step S2001). Thereafter, if the main switch 2029 is closed (Step S2002), then it is determined whether the transmission mode switch 2037 is on (Step S2003).

If the transmission mode switch 2037 is off, a photographing operation is executed (Step S2005). After the completion of the photographing operation, the flow returns to Step S2002.

If the transmission mode switch 2037 is on, detection is executed as to a transmission means for transmitting data, which is connected to the electronic still camera 2100 and the external equipment 2200 (step S2004). The detection as to the transmission means executed in Step S2004 will be described in detail later.

The number of transmission means connected to the electronic still camera 2100 is determined on the basis of the result of the detection as to the transmission means which has been executed in Step S2004 (Step S2006).

If it is determined in Step S2006 that no transmission means is connected, the display device 2021 is made to display a warning (Step S2007), and the flow returns to Step S2002.

If it is determined in Step S2006 that the number of connected transmission means is one, detection of the transmission capability of the connected transmission means is not executed and the flow proceeds to Step S2009.

If it is determined in Step S2006 that the number of connected transmission means is two or more, detection of the transmission capability of each of the connected transmission means is executed (Step S2008). The detection of such transmission capability which is executed in Step S2008 will be described in detail later.

Then, an optimum transmission means is selected on the basis of the detection result obtained in Step S2008.

In this case, a transmission means having as high a transmission speed as possible is selected. This selection method is advantageous in terms of communication cost, batter life and the like.

If the number of connected transmission means is one, the connected transmission means is selected in Step S2009.

Setting according to the selected transmission means is executed (Steps S2010 and S2011).

In the following description, a first transmission means represents a transmission means for executing transmission of data through the transmission cable 2090 by using the connectors 2013 and 2101, and a second transmission means represents a transmission means for executing transmission of data through the transmission modems 2060 and 2070 by using the connectors 2012 and 2102 for providing connection between the camera body and a recording medium and for permitting transmission of data therebetween.

After an image to be transmitted has been selected (Step S2012), if it is determined that the transmission switch 2038 is on (Step S2013), image data indicative of the selected image and its associated information are transmitted to the external equipment 2200 (Step S2016).

If the transmission is completed (Step S2017), the process waits for an operation of the main switch 2029 (the flow returns to Step S2002).

If it is determined in Step S2013 that the transmission switch 2038 remains off in spite of the passage of a predetermined time (Step S2014), the display device 2021 is made to display a warning (Step S2015), and the process waits for an operation of the main switch 2029 (the flow returns to Step S2002).

Figure 17:
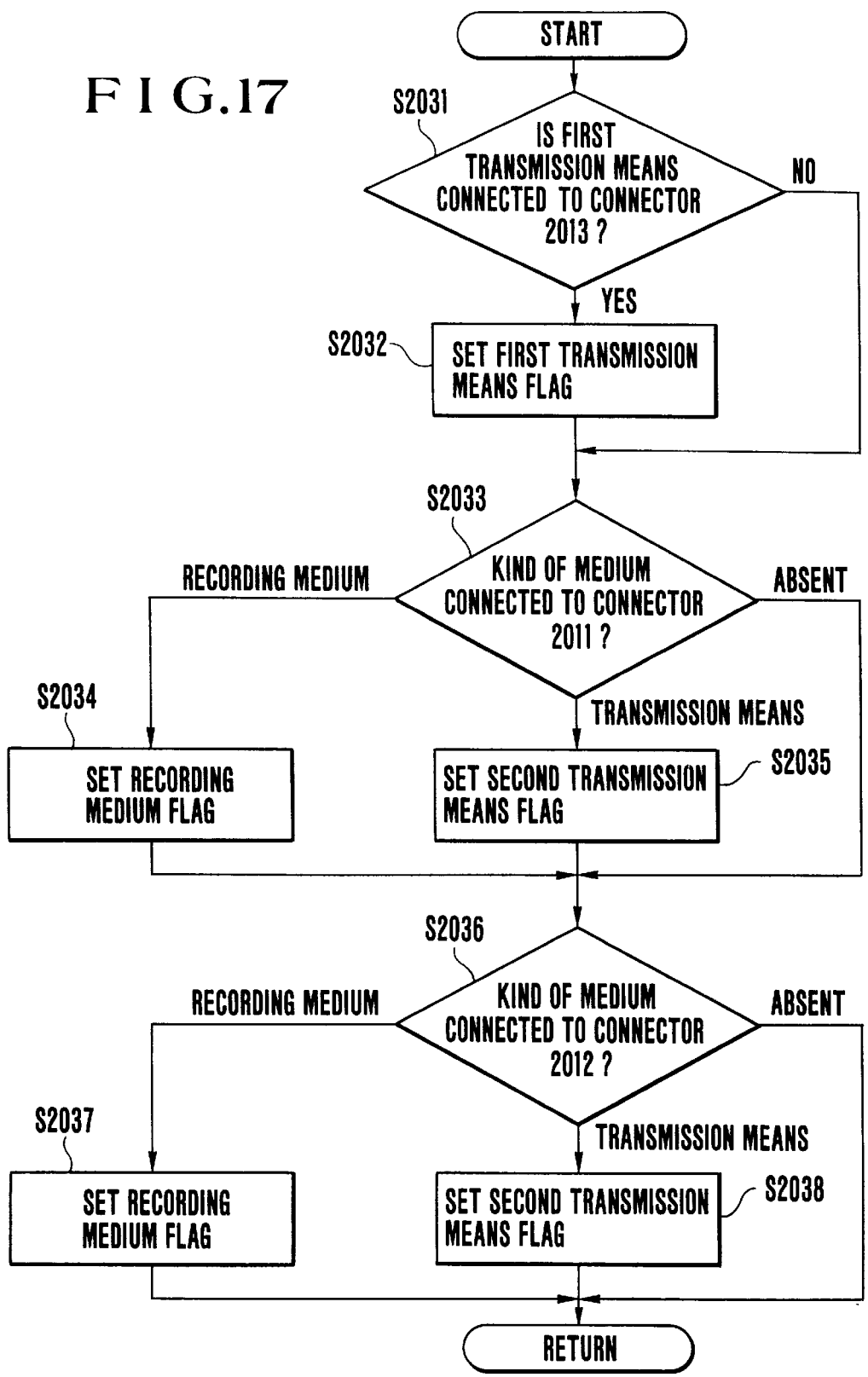
FIG. 17 is a flowchart showing in detail a transmission-means detecting routine associated with the embodiment shown in FIG. 15.

The detection as to the transmission means, executed in Step S2004 of FIG. 16, will be described in detail below with reference to the flowchart of FIG. 17.

Initially, it is determined whether the connector 2013 dedicated to data transmission and the connector 2101 of the external equipment 2200, both of which constitute the first transmission means, are connected to each other by the transmission cable 2090 (Step S2031). If they are connected, a flag indicating that the first transmission means is connected is set (Step S2032). If they are not connected, the flow proceeds to Step S2033.

Then, a decision is made as to the kind of a recording medium connected to the connector 2011 for providing connection between the camera body and the recording medium and for permitting transmission of data therebetween (Step S2033).

If it is determined in Step S2033 that the connector 2102 of the external equipment 2200 is connected to the connector 2011 through the transmission modem 2060, the transmission modem cable 2080 and the transmission modem 2070, a flag indicating that the second transmission means is connected is set (Step S2035).

If it is determined in Step S2033 that not the transmission means but a recording medium is connected, a recording-medium flag is set according to the recording medium (step S2034). If nothing is connected to the connector 2011, the flow proceeds to Step S2036, where a decision is made as to the kind of a recording medium connected to the connector 2012 for providing connection between the camera body and the recording medium and for permitting transmission of data therebetween.

If it is determined in Step S2036 that the connector 2102 of the external equipment 2200 is connected to the connector 2012 through the transmission modem 2060, the transmission mode cable 2080 and the transmission modem 2070, the flag indicating that the second transmission means is connected is set (Step S2038).

If not the transmission means but a recording medium is connected, the recording-medium flag is set according to the recording medium (Step S2037). If nothing is connected to the connector 2012, nothing is executed and the flow is brought to an end.

In the above-described eighth embodiment, since only one transmission modem is connected to the external equipment 2200, two modems are not connected to both of the connectors 2011 and 2012 of the electronic still camera 2100.

Figure 18:
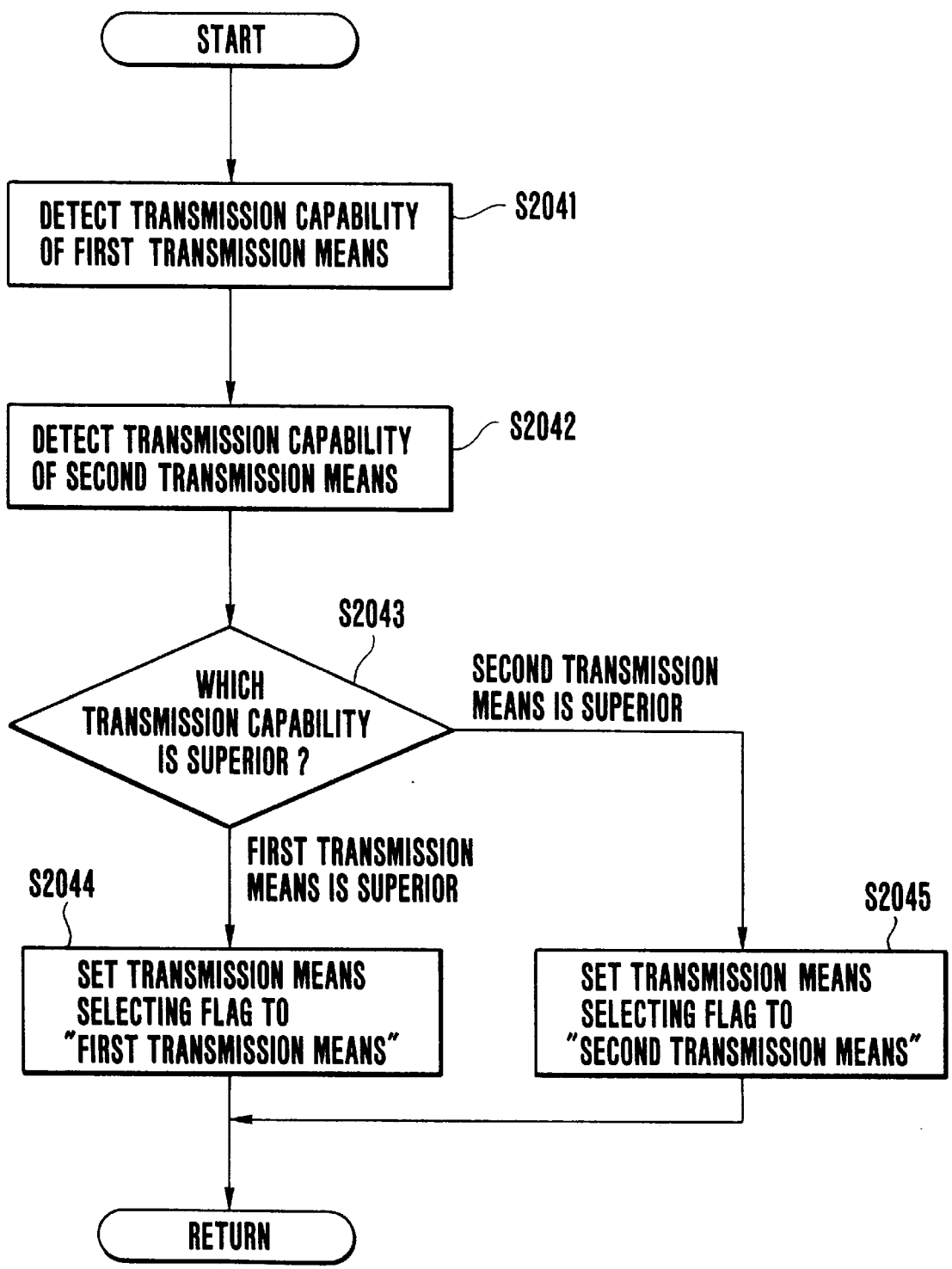
FIG. 18 is a flowchart showing in detail a transmission-capability detecting routine associated with the embodiment shown in FIG. 15.

The detection of the transmission capability, executed in Step S2008 of FIG. 16, will be described in detail below with reference to the flowchart of FIG. 18.

The transmission capability of the first transmission means is detected by executing transmission between the electronic still camera 2100 and the external equipment 2200 through the transmission cable 2090, connected to the connector 2013 dedicated to data transmission, and the connector 2101, both of which constitute the first transmission means (Step S2041).

Then, the transmission capability of the second transmission means is detected by executing transmission between the electronic still camera 2100 and the external equipment 2200 through the transmission modem 2060 connected to the connector 2011 or 2012 which serve to provide connection with a recording medium and also to permit data transmission, the transmission cable 2080, the transmission modem 2070 and the connector 2102, all of which constitute the second transmission means (Step S2042).

A comparison is made between the transmission capabilities detected in Steps S2041 and S2042, thereby determining which of the first and second transmission means is superior in transmission capability (data transmission speed) (Step S2043).

It is determined in Step S2043 that the first transmission means is superior, a selecting flag is set to "first transmission means" (Step S2044). If it is determined that the second transmission means is superior, the selecting flag is set to "second transmission means". After the completion of the setting, the above-described transmission-capability detecting routine is brought to an end.

In the transmission means selecting processing executed in Step S2009 of FIG. 16, if a plurality of transmission means are connected, the display device 2021 may be made to provide display indicative of an optimum transmission means (having the highest transmission speed) on the basis of the transmission capabilities of the respective transmission means which are detected in Step S2008, and an operator may select the desired transmission means by manually operating a switch (not shown). In this arrangement, if a single transmission means is connected, the connected transmission means is automatically selected.

Figure 19:
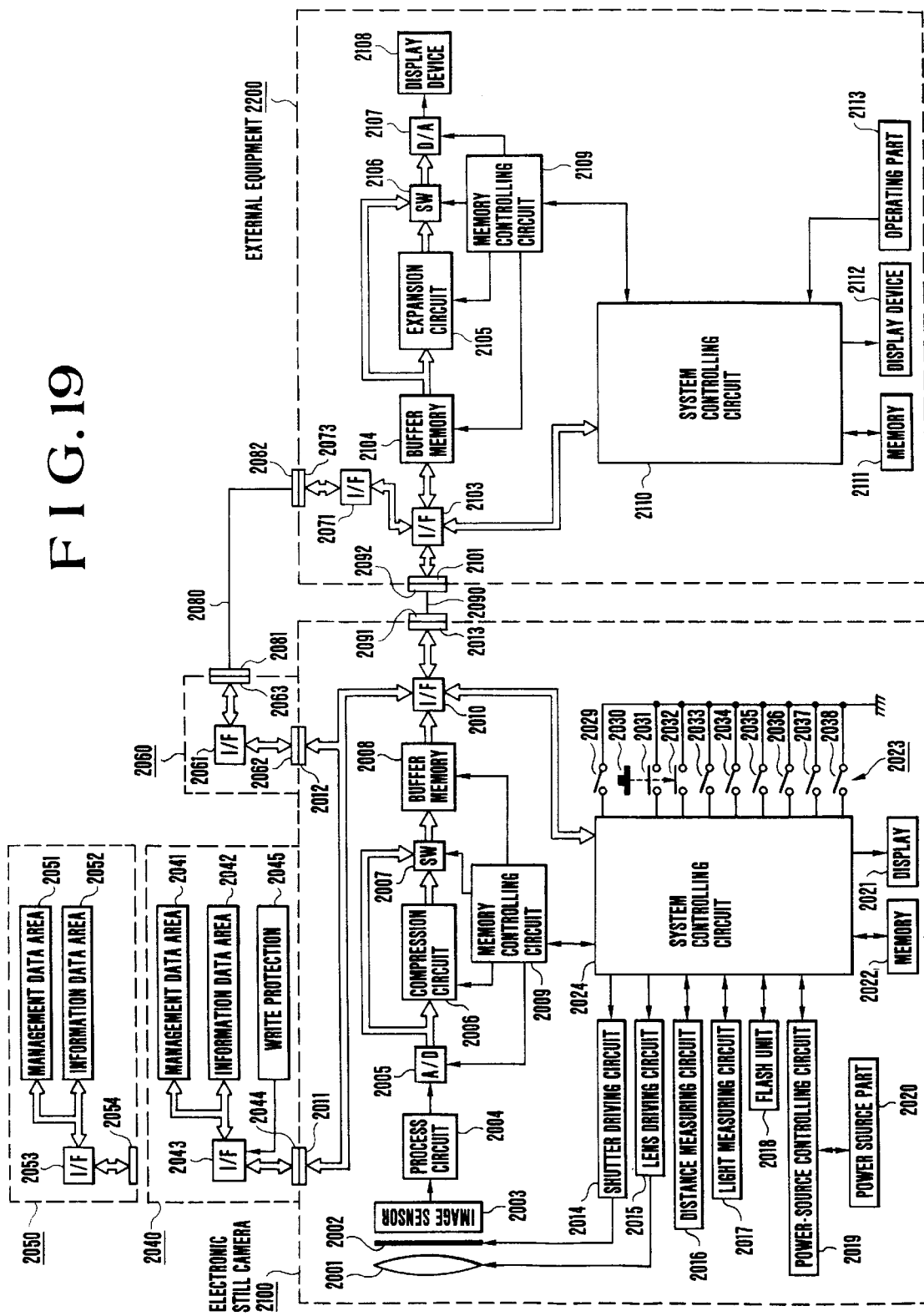
FIG. 19 is a block diagram showing a transmission system according to a ninth embodiment of the present invention.

The transmission modem 2070 may, of course, be incorporated in the external equipment 2200, as in the ninth embodiment shown in FIG. 19.

In the description of the eighth embodiment, reference has been made to the example in which the memory card 2040 and the hard disk unit 2050 are prepared separately from, and can be arbitrarily connected to, the camera body of the electronic still camera 2100. However, if each of the memory card 2040 and the hard disk unit 2050 is provided with a connector for connection to a transmission modem, either or both of them may be fixed to the camera body of the electronic still camera.

Although the above-described eighth embodiment has only two transmission means, the number of transmission means is not limited to two. Even if three or more transmission means are provided, it is possible to execute optimum transmission of data by carrying out similar control.

As described above, the apparatus according to each of the eighth and ninth embodiments includes a plurality of transmission means, and is arranged so that if the plurality of transmission means are connected to external equipment, the transmission capabilities of the respective transmission means are detected and a transmission means having an optimum transmission capability is selected to execute transmission of data. Accordingly, it is possible to provide an information signal transmitting apparatus having a greatly improved operability which makes it possible for an operator to execute optimum transmission of data without taking account of the performance of receiving-side external equipment or the performance of a transmission means provided on the apparatus itself.

What is claimed is:

1. An image pickup device, comprising:
   (a) image pickup means;
   (b) a plurality of kinds of storage means detachable relative to the pickup device, for storing outputs of the image pickup device;
   (c) discriminating means for discriminating the kinds of storage means mounted on the image pickup means; and
   (d) switch means for varying an interval for continuous supply of power to the recording medium without recording in an image recording mode after completion of the storage according to results of discrimination by the discriminating means.

2. An image pickup device according to claim 1, wherein the storage means includes a semi-conductor memory and magnetic recording means.

3. An image pickup device according to claim 2, wherein the magnetic recording means includes a hard disc device.

4. An image pickup device according to claim 1, wherein the image pickup device has a connection contact point for mounting the plurality of kinds of storage means.

5. An image pickup device according to claim 1, wherein the image pickup device has a release switch.

6. An image pickup device according to claim 5, wherein the image pickup device stores the output of the image pickup means following an operation of the release switch.

7. An image pickup device according to claim 5, wherein the switch means switches the time for continuous supply of power to the recording medium after completion of the storage by switching a power saving mode.

8. An image pickup device according to claim 4, wherein the connection contact point is further connectable to communication means.

9. An image pickup device according to claim 1, wherein the switch means switches a power saving mode according to image pickup conditions in the image pickup means.

* * * * *

UNITED STATES PATENT AND TRADEMARK OFFICE
CERTIFICATE OF CORRECTION

PATENT NO. : 6,253,023 B1
DATED : June 26, 2001
INVENTOR(S) : Nobuo Fukushima et al.

It is certified that error appears in the above-identified patent and that said Letters Patent is hereby corrected as shown below:

Column 1,
Line 34, delete "the memory" and insert -- a memory --.
Line 35, delete "the large" and insert -- a large --.

Column 2,
Line 41, delete "follows: After" and insert -- follows: after --.

Column 3,
Line 20, delete "purpose" and insert -- purposes --.

Column 9,
Line 55, delete "operation et seqq." and insert -- operation. --.
Line 63, delete "operation et seqq." and insert -- operation. --.
Line 64, delete "et seqq".

Column 15,
Line 55, delete "recording. mode" and insert -- recording mode --.

Column 32,
Line 36, delete "batter" and insert -- battery --.

Column 34,
Line 4, delete "It is" and insert -- If it is --.

Signed and Sealed this

Thirtieth Day of April, 2002

Attest:

JAMES E. ROGAN
*Attesting Officer*     *Director of the United States Patent and Trademark Office*